DWELL-REJECT-STOP CIRCUIT.

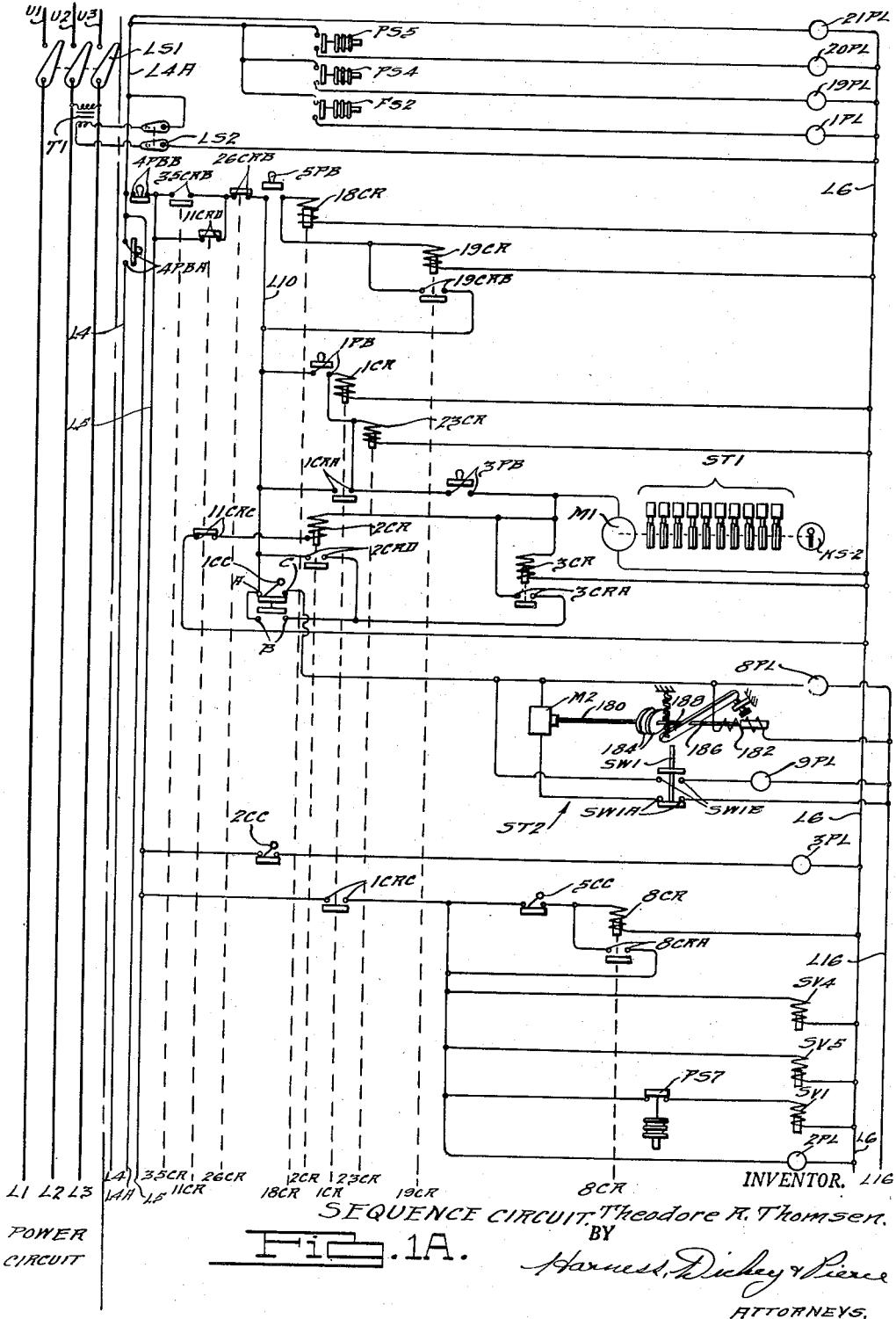

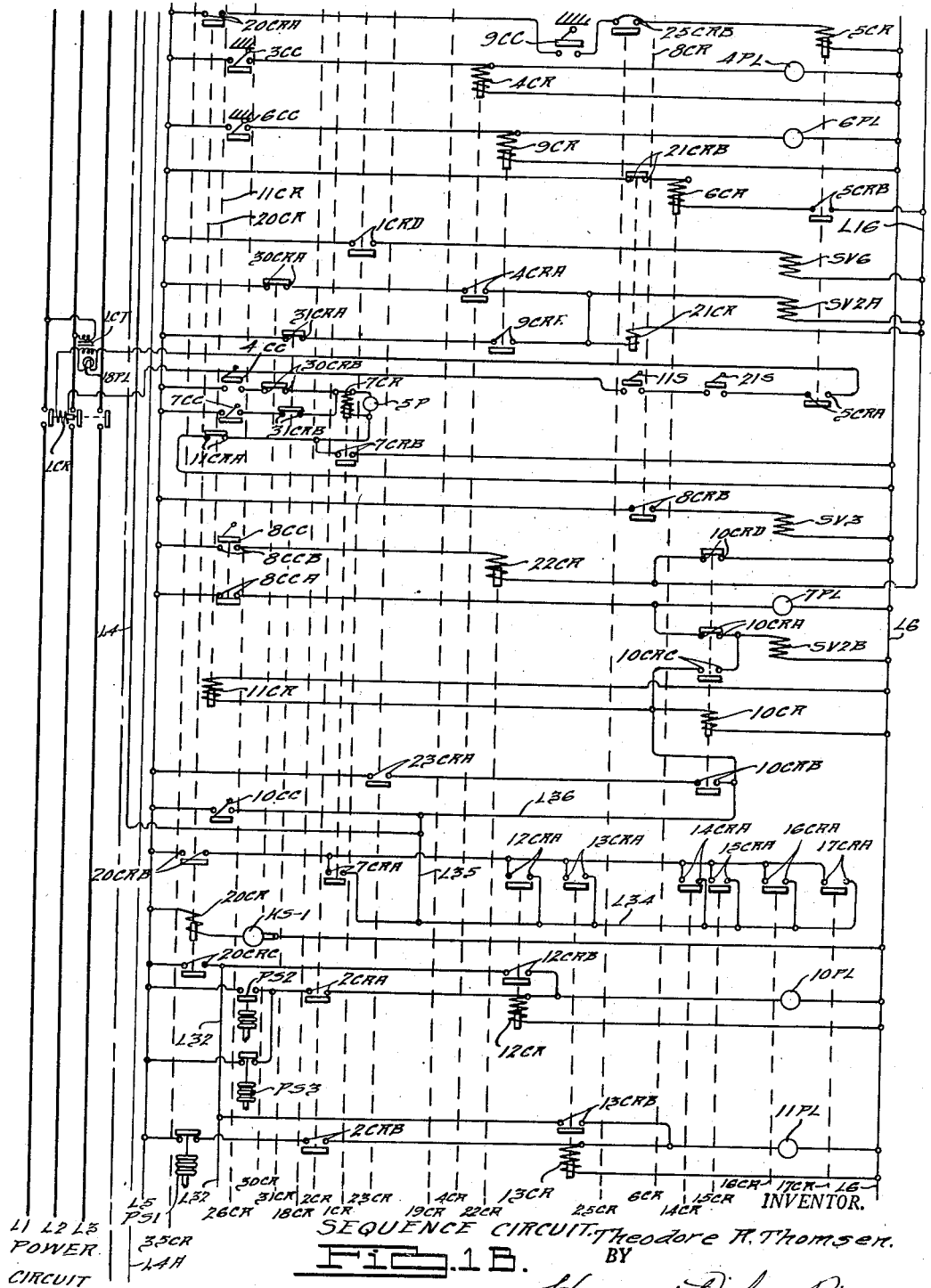

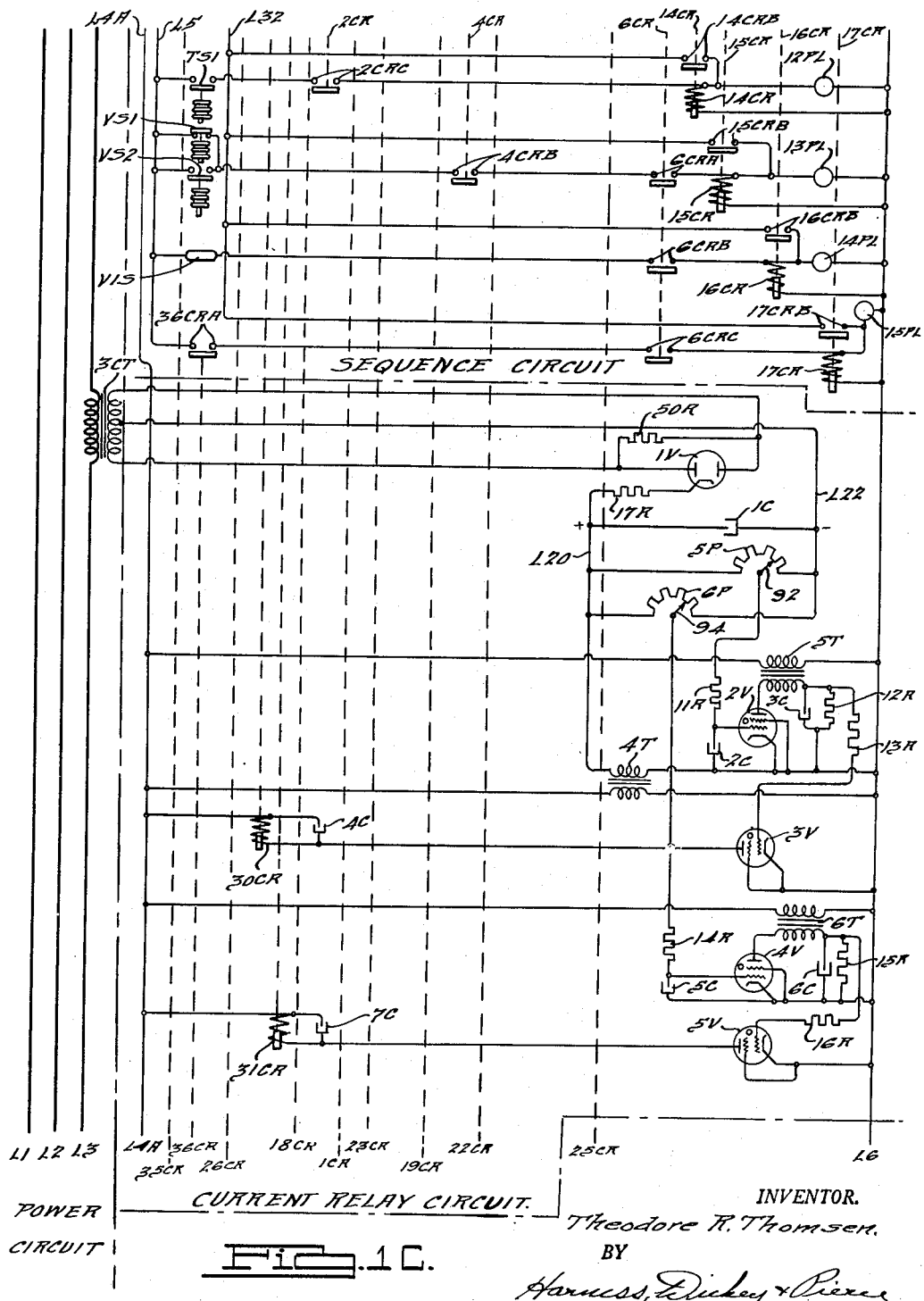

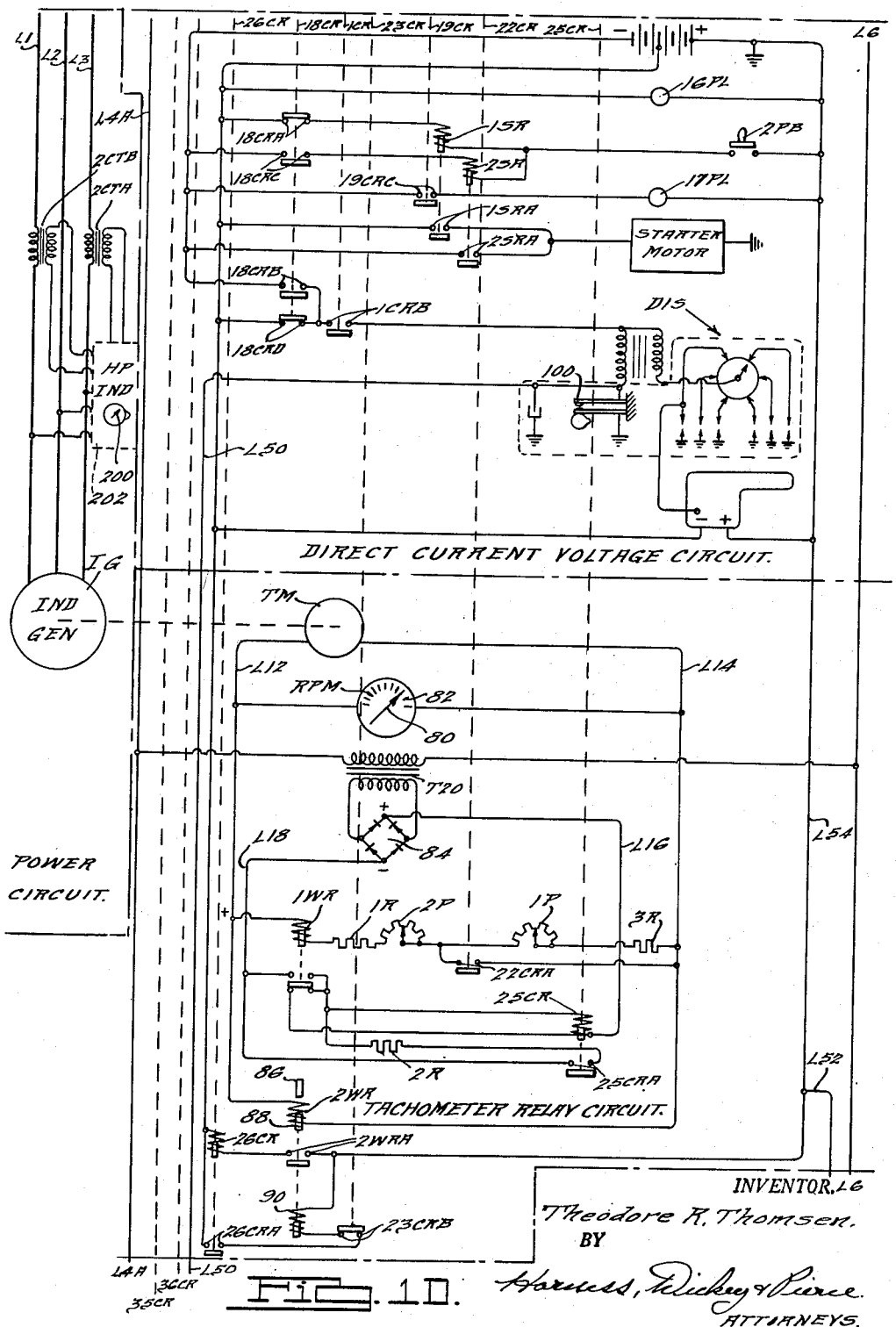

DWELL-REJECT-STOP CIRCUIT

INVENTOR.
Theodore R. Thomsen.
BY
Harness, Dickey & Pierce.
ATTORNEYS.

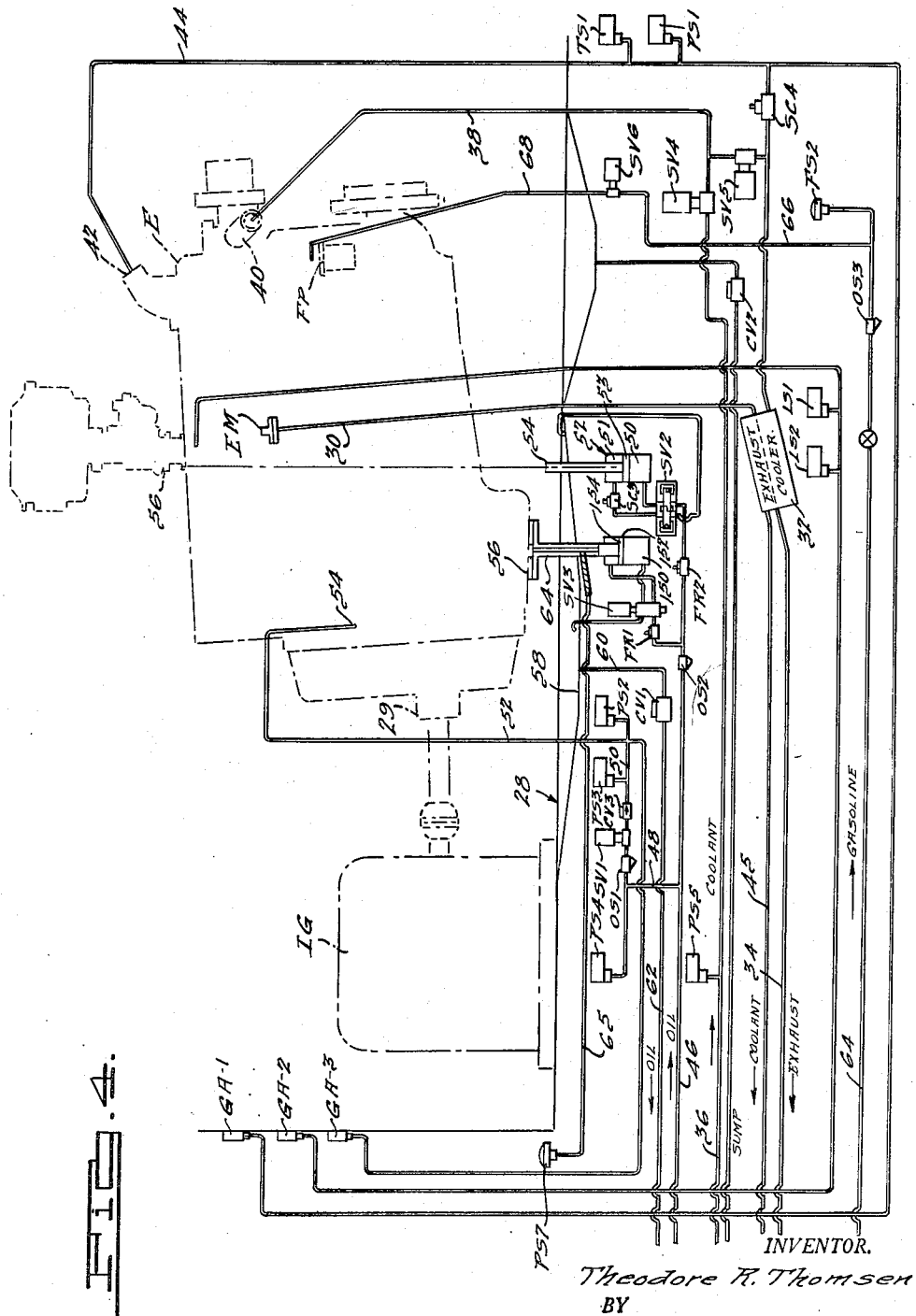

United States Patent Office 2,700,301
Patented Jan. 25, 1955

1

2,700,301

ENGINE TESTING APPARATUS

Theodore R. Thomsen, Farmington, Mich., assignor to Weltronic Company, Detroit, Mich., a corporation of Michigan Application May 26, 1949, Serial No. 95,556

30 Claims. (Cl. 73—116)

This invention relates generally to apparatus for testing prime movers and is particularly adapted among other uses for the testing of internal combustion engines.

A primary object of this invention is to provide a useful and economical apparatus for testing prime movers.

Another object of this invention is to provide an apparatus for testing prime movers which is automatic in its operation.

Another object of this invention is to provide such an apparatus which will automatically terminate the test upon the occurrence of a faulty operating characteristic.

A further object of this invention is to provide such an apparatus whereby the first reject condition due to a faulty operating characteristic will render the apparatus ineffective to indicate a subsequent faulty characteristic until such time as the apparatus has been reset to eliminate the effect thereon of the first reject condition.

A further object of this invention is to provide such an apparatus which will visually indicate the particular reject which caused the shutdown of the apparatus.

A further object of this invention is to provide such an apparatus which will place the power generated by the prime mover being tested in a condition in which it may be utilized and thereby prevent its waste.

Other objects of this invention will be apparent from the specification, the claims appended thereto and the drawings in which like reference characters have been used to indicate like parts.

Figs. 1A, 1B, 1C, 1D, 1E, and 1F when arranged in end-to-end relation present a schematic diagram of the circuits of the apparatus;

Fig. 4 is a schematic view illustrating the fluid flow circuits used when the apparatus is connected to test an internal combustion engine.

Generically, the invention comprises a testing apparatus for use in testing prime movers and, in accordance with the patent statutes, there is illustrated herein a preferred form of the apparatus arranged to test an internal combustion engine such as a gasoline engine. The invention further comprises an arrangement whereby a gasoline engine may be operatively associated therewith and placed under control of the testing apparatus whereby the engine may be run for a predetermined timed interval at no load after which it is automatically increased in speed to a desired speed after which it is loaded to a desired percentage of full test load condition for example half load and operated at half load for a predetermined timed interval after which the load thereon is again increased while the engine is caused to operate at substantially the same speed whereby on the attainment of the predetermined maximum test load it is again operated for a predetermined time interval and after which time if the engine has satisfactorily passed all the requirements the apparatus will act to shut down the engine indicating that the engine has satisfactorily passed all of the requirements and may be removed and a new engine placed thereon to be tested by the apparatus.

Figure 1E:
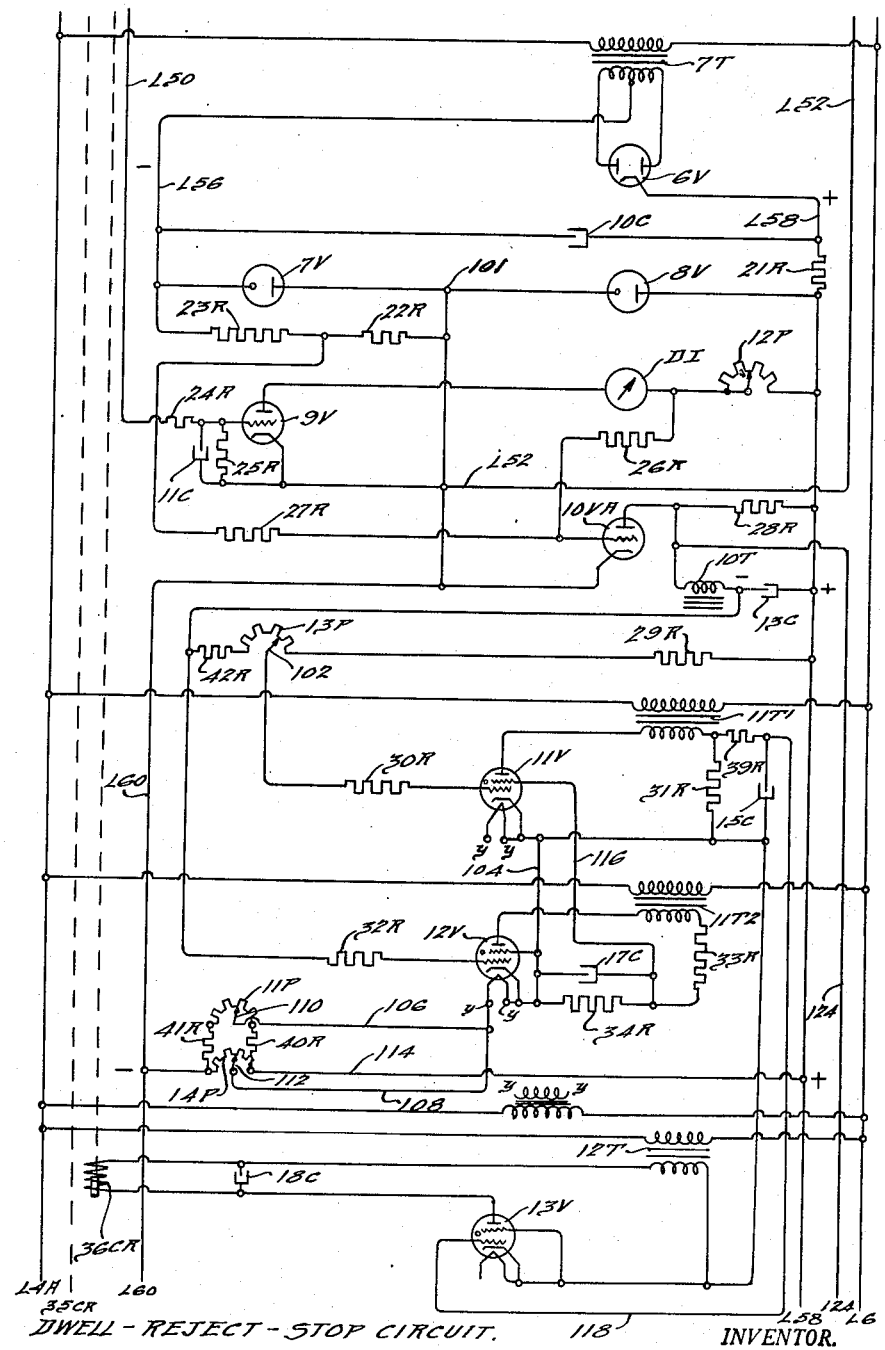
Figure 1F:
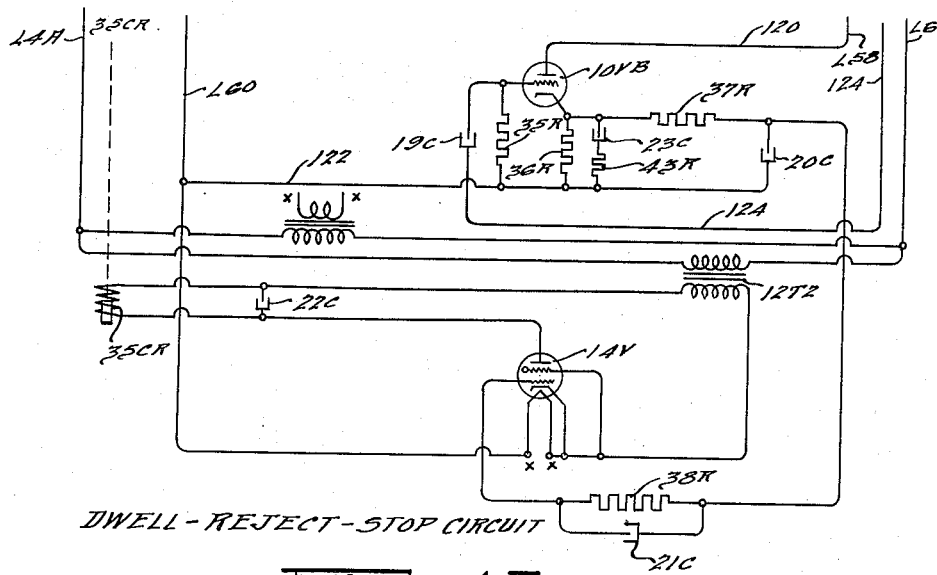

The apparatus comprises generally a sequence circuit illustrated in Figs. 1A, 1B and the upper part of 1C which sequencing circuit includes the sequence timers, relays, solenoid valves, pressure and vacuum switches, and push buttons which control the sequence operation of the test apparatus. The current relay circuit is shown in the lower portion of Fig. 1C and is responsive to the output power of the prime mover or engine being tested and controls the hydraulic circuit which in turn controls the engine throttle for operating the engine at the various desired conditions of load, in this case at one-half and at full load points. The direct current voltage circuit is shown in the upper portion of Fig. 1D and comprises the necessary relays to connect either six or twelve volts from the customer's supply to the motor starter and engine distributor. The power timing light to be disclosed in greater detail below receives its energy from the direct current supply so that it is considered to be in this circuit. The tachometer relay circuit is shown in the lower portion of Fig. 1D and comprises a tachometer magneto TM, a revolution per minute (R. P. M.) indicator and certain relays which function at predetermined speeds. The dwell-reject-stop circuit is shown in Figs. 1E and 1F. This circuit is responsive to the percentage time the distributor primary circuit contacts are open and includes a dwell indicating meter DI as well as relays for actuating the sequence circuit in the event that the dwell falls outside of the predetermined desired limits. The power circuit is shown on the left-hand side of Figs. 1A, 1B, 1C, and 1D and comprises the induction generator, the motor starter and disconnect switch which connects this generator to a power line such as a three-phase sixty cycle utility line and the power transformer which supplies the operating voltage to the various control circuits heretofore mentioned.

Figure 2:
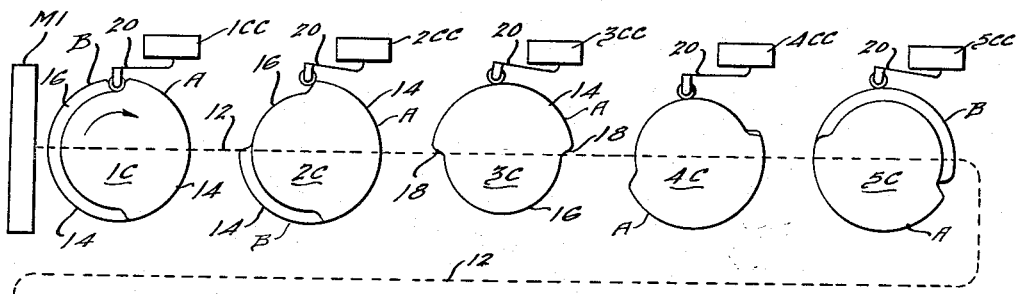
Fig. 2 is a diagrammatic view showing the timing mechanism for controlling the circuits.
Figure 2:
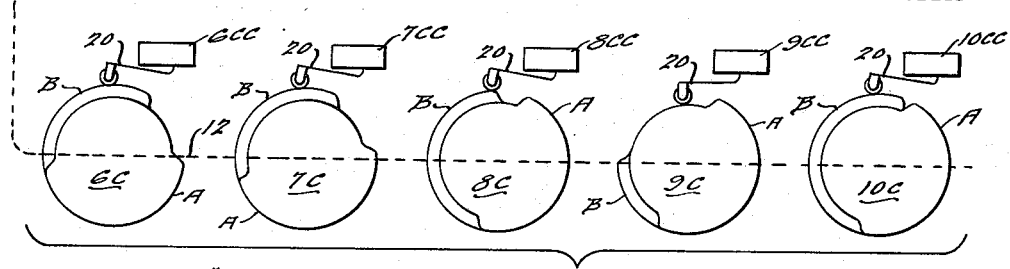

The sequence circuit includes a timing apparatus STI diagrammatically illustrated in Fig. 2 apart from the circuit which it controls and comprises a driving motor M1, a shaft diagrammatically shown at 12 and which shaft has secured thereon and rotates a plurality of cams generally designated 1C, 2C, 3C, 4C, 5C, 6C, 7C, 8C, 9C, and 10C. Each of these cams includes an A and a B segment, the A segment being shown in front of the B segment and each segment comprising a raised or greater radius portion 14 and a lower or reduced radius section 16 each of which sections 14 and 16 extends over a substantially 180° arc and which are joined together by an inclined ramp 18. By arranging the relative rotational positions of the A and B sections about the shaft, the length of the effective raised portion, which is the combined length of the two sections 14 and 16, may be adjusted to provide the desired degrees of rotational movement of the shaft 12 that the switches 1CC, 2CC, 3CC, 4CC, 5CC, 6CC, 7CC, 8CC, 9CC and 10CC are actuated. The switches 1CC to 10CC may comprise what is generally known in the trade as micro switches and which have an operating button diagrammatically shown at 20 which is actuated by the cam surfaces 14 and 16. When the actuator 20 is against the cam section 16, it may be said to be in its normal position and when it is riding about the cam section 14 it is considered as being in its actuated position. The switches 1CC and 8CC are single pole double throw switches and will be maintained in either of these two closed positions depending upon the cams with which they are associated, the remainder of the switches are of the single pole single throw variety. The switch 2CC is normally closed, the switch 3CC is normally closed, the switch 4CC is normally open, the switch 5CC is normally closed, the switch 6CC is normally closed, the switch 7CC is normally closed, the switch 9CC is normally open and the switch 10CC is normally closed.

Figure 3:
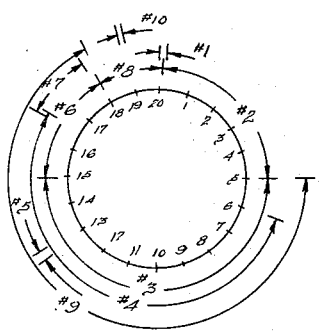
Fig. 3 is a schematic view showing the operation of the switches during a complete testing cycle.

In the particular apparatus being described the motor M1 drives the shaft 12 at such a speed that the shaft 12 will make one complete revolution in exactly the test period which may be, for example, 20 minutes, as indicated in Fig. 3 by the numerals 1 through 20. A study of this figure indicates that switch 1CC will be in its normal position for only a very short portion of the rotation of the shaft 12 and serves to stop the motor M1 at the end of each revolution of the shaft 12. Upon rotation of the shaft 12 in a clockwise direction, the switch 1CC will almost immediately be placed in its actuated position while the switch 2CC will be placed in its normally closed position energizing the 5 minute idle time pilot light 3PL. It will be apparent that the switches 3CC, 5CC, 6CC, 7CC, 8CC and 10CC are initially held in their actuated position while switches 4CC and 9CC are initially held in their normal positions. Upon approximately 90° clockwise rotation of the shaft 12, the switch 2CC will be placed in its actuated or open position extinguishing light 3PL in which position it will remain for the rest of the testing cycle. Near the end of the 5 minute idle time period, the cam 9C will close the switch 9CC which prepares for the energization of the contactor LCR and which switch 9CC will, during the 5 minute idle period, prevent connection of the generator to the power line even though the engine speed is of the required magnitude. At about this same time, the cam 3C causes the switch 3CC to close energizing the one-half load pilot light 4PL and the mechanism for increasing the fuel flow to the engine whereby its output is increased. At predetermined time interval subsequent to the actuation of switch 3CC and which interval is long enough for a normal engine to assume half load, the cam 4C will close the switch 4CC. At the end of the one-half load period cam 3C will open switch 3CC extinguishing the light 4PL and at substantially the same time the switch 6CC will be closed by cam 6C energizing the full load pilot light 6PL as well as the mechanism for increasing the fuel flow to the engine for full load operation. At a predetermined interval subsequent to closure of switch 6CC, and which interval is sufficient for a normal engine to come up to full load, cam 7C will close switch 7CC. At the end of the full load time, cam 8C will close switch 8CC and reduce the engine fuel flow to idle flow and the cam 6C will open switch 6CC extinguishing the light 6PL. Just after closure of switch 8CC, cam 9C opens switch 9CC to prevent subsequent connection of the generator to the power line. At a slightly later time, cam 10C momentarily closes switch 10CC which re-energizes the fuel decreasing mechanism to insure that the fuel flow is at minimum and also de-energizes fuel supply solenoid SV6. Momentary opening of switch 1CC by cam 1C terminates the operation of the motor 1. The effect of the actuation of the various switches will be described in greater detail below in connection with the operation of the sequence circuit.

As shown in Fig. 4, the prime mover or engine being tested E is suitably located on the test stand diagrammatically shown at 28. The output shaft 29 of the engine E is suitably connected to the rotor shaft of the induction generator IG. The engine exhaust manifold EM is connected by means of conduit 30 through an exhaust cooler 32 and conduit 34 to a suitable location for disposing of the exhaust gases. Coolant for the engine is supplied through the conduit 36 from a suitable source of supply under control of the solenoid valve SV4 into conduit 38 which is connected to the coolant inlet connection 40 of the engine. If desired, the coolant supply may have its temperature regulated. The coolant discharges from the engine coolant outlet connection 42 into conduit 44 from whence it flows through a flow rate controlling valve SC4 and the exhaust cooler 32 to the coolant return conduit 45 back to the source for subsequent recirculation. Lubricating oil is supplied to the engine through the conduit 46 from a suitable source of supply through branch conduit 48, oil strainer OS1, solenoid valve SV1, check valve CV3 in conduit 50, and through conduit 52 to the oil inlet connection 54 of the engine E. Normally when the engine E is being tested, its crankcase oil drain opening 56 is not closed by the usual closure plug but is left open whereby the crankcase drains into the sump 58 of the test stand and returns therefrom through conduit 60, check valve CV1 and conduit 62 to the source of oil supply. During a certain portion of the engine test, the drain opening 56 is closed by means of a hydraulically actuated closure member 64 whereby the engine will retain the oil supplied thereto. After a predetermined quantity of oil has accumulated in the crankcase, the pressure switch PS7 which is in open communication with the oil in the crankcase through an annular opening in the member 64 and conduit 65 will act to close the solenoid valve SV1 whereby further oil from the supply to the engine will be prevented and the engine will operate on its own lubricating system. Fuel, such as gasoline for the engine E, is supplied from a suitable source through the conduit 64, strainer OS3, conduit 66, solenoid valve SV6 and conduit 68 to the inlet of the fuel pump FP of the engine E. The conduits 36, 46 and 66 are each provided with pressure switches PS5, PS4 and FS2 respectively for actuating certain elements of the sequence circuit as will be described below. Pressure gauges GA1, GA2, GA3 are provided for indicating coolant, manifold and lubricant pressures.

It is believed that the details of the various circuits schematically shown in Figs. 1A through 1F inclusive may best be described by a description of operation of the test stand which is as follows:

Lines L1, L2 and L3 are connected to a suitable three-phase source of alternating current such as a three-phase sixty cycle public utility line represented at U1, U2 and U3 by means of a line disconnect switch LS1 whereby the lines L1, L2 and L3 are energized, such energization being interrupted from reaching the transformer 3CT in line L3 and transformers 2CTA and 2CTB respectively in lines L3 and L1 and the induction generator IG by means of the open contacts of the line contactor relay LCR. The primary of transformer T1 is connected between the lines L2 and L3 and is immediately energized upon closure of the line switch LS1. The primary winding of the transformer LCT is connected between the lines L1 and L2. It will be apparent that from the connection of the transformers T1 and LCT that if any of the phases of the supply as supplied by the conductors U1, U2 and U3 be defective that either the line contactor transformer LCT will not be energized and therefore the line contactor relay LCR is not energized and the pilot light 18PL will not be illuminated or if the phase between lines L2 and L3 be defective the transformer T1 will not be energized and therefore the pilot light 21PL will not be illuminated. The secondary winding of the transformer T1 is connected through disconnect switches LS2 to conductors L4A and L6. Conductor L4A may be connected to conductor L4 upon closure of the normally open switch 4PBA to provide an emergency shutdown of the test stand as will be more clearly pointed out below. Conductor L4A is also connected through normally closed switch 4PBB to the line L5. The pilot light 21PL is connected directly between the lines L4A and L6 and will be illuminated at all times that the switch LS1 is closed. The pilot lights 1PL, 19PL and 20PL are between the lines L4A and L6 in series with pressure switches FS2, PS4 and PS5 respectively. Pressure switch FS2 sensitive to the pressure of the gasoline in the fuel conduit 66 will be closed whenever the gasoline supply is at the predetermined desired pressure whereby illumination of light 1PL will indicate the existence of a fuel supply. Pressure switch PS4 sensitive to the pressure of the lubricating oil in the conduit 46 will be closed whenever the pressure of the oil supply is at the desired pressure thereby illuminating light 19PL. Pressure PS5 sensitive to the pressure of the coolant in the conduit 36 will be closed whenever the coolant pressure is at the desired pressure to illuminate light 20PL. Therefore to operate the stand, the pilot lights 1PL, 19PL, 20PL and 21PL should all be illuminated. To start the engine, switch 1PB is closed whereby the relays 1CR and 23CR are energized. Energization of relay 1CR closes its contacts 1CRA, 1CRB, 1CRC and 1CRD. Closure of contacts 1CRA establishes a holding circuit for the relays 1CR and 23CR. Closure of the contacts 1CRB closes the ignition circuit to the distributor DIS of the engine E. Closure of the contacts 1CRC energizes the solenoid valves SV1, SV4 and SV5, opening these valves whereby the lubricating oil and coolant are supplied to the engine and to the exhaust cooler but due to the now open switch 5CC, relay 8CR is not yet energized. Closure of the contacts 1CRD energizes the valve SV6 whereby fuel is supplied to the fuel pump FP. Energization of the relay 23CR closed its contacts 23CRA and opened its contacts 23CRB. Closure of contacts 23CRA establishes a preparatory circuit for the holding circuit of relay 10CR while opening of contacts 23CRB de-energizes the reset solenoid 90.

The engine E may now be started by closing switch 2PB (Fig. 1D) which will energize one of the starting relays 1SR or 2SR for the engine starter motor depending upon the selected voltage as determined by the condition of the relay 18CR. In this case it is assumed that six volt source is to be used and therefore the energizing switch 5PB is not closed to energize relay 18CR so that 1SR is energized through normally closed contacts 18CRA closing its contacts 1SRA whereby the starter motor is energized for starting the motor. When the motor starts, the switch 2PB will, of course, be opened de-energizing the relay 1SR. The engine is now operating but has not yet been put under control of the sequence circuit and may be controlled manually so that the necessary final adjustment may be made. Preferably the throttle idle setting is set to cause operation at about 300 R. P. M.

When the engine operation is assured and it is desired to commence the test, the push button 3PB of the timer ST1 is closed whereby a circuit is completed from the line L4A through the normally closed push button 4PBB, the normally closed relay contacts 11CRD, the normally closed contacts 26CRB, conductor L10, the now closed contacts 1CRA, the push button 3PB, the motor M1 of the timer ST1 to the line L6. Closure of the push button 3PB also energizes a circuit as described above as far as the push button 3PB and then this circuit goes through the energizing winding of the relay 2CR, the normally closed contacts 11CRC and to the line L6 whereby contacts 2CRA, 2CRB, 2CRC and 2CRD are closed. Closure of the switch 3PB also energizes the relay 3CR, the energizing winding of which is connected in parallel with the motor M1 closing its single contacts 3CRA. Closure of the contacts 2CRA, 2CRB and 2CRC establishes preparatory circuits for the reject relays 12CR, 13CR, and 14CR respectively. Closure of the contacts 2CRD and 3CRA establishes a holding circuit which holds in the relays 2CR and 3CR so that subsequent opening of the push button switch 3PB will not interfere with operation of the apparatus.

Within a few seconds subsequent to the starting of the timer ST1 as indicated in Fig. 2, the switch 1CC will be actuated by the cam 1C associated therewith for closing its contacts B and opening its contacts A. Opening of the contacts A de-energizes the stand idle timer ST2 and also establishes a circuit about the contacts 2CRD in parallel therewith to insure continued operation of the timer ST1 throughout a complete timing operation. At the end of the complete revolution of the shaft 12 of the timer ST1, the depressed portion of the first cam 1C will again permit the switch 1CC to open its B contacts and close its A contacts again energizing the stand idle timer ST2 and permit the timer ST1 to stop. Normally, however, the relay 2CR will be maintained energized during the entire operation of the timer ST1, it being de-energized only upon the occurrence of a reject condition which will be explained below. Since the relay 2CR is not energized to energize the reject circuit until at the time that the main timer ST1 is energized any closure of the oil pressure switches PS2 or PS3 which might occur during initial starting conditions of the motor and before the lubricating equilibrium conditions have been reached will not act to operate the reject for closing down the apparatus. Almost immediately upon starting of the timer ST1, the normally closed switch 2CC will move from its held open position as shown in Fig. 2 to its closed position due to the movement of the operating finger 20 thereof down on to the lower cam section 16 whereby the pilot light 3PL is energized indicating that the five minute idle time run is in progress. At the end of five minute time interval, the finger 20 of the switch 2CC will again move up on to the enlarged diameter portion of cam 2C opening the switch 2CC and extinguishing the light 3PL indicating that the five minute idle time period has elapsed. Near the end of the five minute idle time period the cam 9C will actuate the switch 9CC from its normally open position to its actuated or closed position for closing a preparatory circuit for the energizing winding of the control relay 5CR which controls the energization of the line contactor relay LCR for connecting the inductor generator IG to the lines U1, U2 and U3. Actual energization of the relay 5CR will not occur until energization of the control relay 25CR which energization is controlled by the tachometer relay circuit as will be described in detail below. It should be noted that the control relay 20CR will be continually energized as long as the key-actuated switch KS1 (Fig. 1B) is closed, which is the normal operating condition of the test apparatus, whereby the contacts 20CRA in the energizing winding circuit of the relay 5CR will be maintained closed. Subsequent to closure of switch 9CC, the cam 3C will have rotated sufficiently so that the normally closed switch 3CC which formerly was held open by the cam 3C will move to its closed position energizing the control relay 4CR and the pilot light 4PL through an obvious energizing circuit. The illumination of the pilot light 4PL indicates that the apparatus is operating during the one-half load period and this pilot light 4PL will be maintained energized throughout this operating period. Energization of the control relay 4CR closes its contacts 4CRA and 4CRB. Closure of the contacts 4CRA completes an obvious energizing circuit for the solenoid winding SV2A of the four-way solenoid SV2 whereby the oil supplying conduit 46 is opened to the chamber portion 50 of the piston cylinder assembly 52 below the piston 53 and the upper chamber portion 51 above piston 53 is opened to the oil return conduit 62. The operating shaft 54 connected to piston 53 of the assembly 52 is operatively connected to actuate the throttle 56 of the engine being tested and upward movement of the shaft 54 moves the throttle 56 toward open position increasing the engine output. The winding SV2A will remain energized admitting more oil to the chamber portion 50 causing the throttle to be moved toward a further open position until one-half load output at a desired speed is attained. As the speed of the engine rises to approximately the desired testing speed, the relay 25CR will be energized to close its contacts 25CRB to complete the energizing circuit for relay 5CR whereby its contacts 5CRA and 5CRB will close. Closure of the contacts 5CRA completes the energizing circuit for the line contactor relay LCR whereby the generator IG is connected to the power line. Closure of contacts 5CRB is preparatory only since contacts 21CRB are now open. The throttle will continue to be opened whereby the engine E will drive the generator IG to supply power to the lines U1, U2 and U3, the magnitude of which will be measured by the current relay circuit. As the magnitude of this power increases to that indicative of one-half load engine operation relay 30CR will be energized opening its contacts 30CRA and deenergizing the winding SV2A whereby further opening movement of the throttle will be terminated due to the opening of the circuit through winding SV2A.

Just subsequent to the normally expected time for the engine to reach this one-half load condition the cam 4C will close the switch 4CC which with a normal engine will be without effect since the half load power reject circuit will previously have had the contacts 30CRB opened. The reject circuits for testing manifold vacuum, vibration and distributor contact dwell will be made effective upon attainment of half load operation.

At a selected time during half load testing the cam 5C will momentarily close the switch 5CC whereby the solenoid SV3 is energized to close the oil drain in the engine crankcase and permit filling of the engine with oil which filling will be terminated at a predetermined level thereof by switch PS7 after which time the pressures in the conduit 52 will be that of the engine lubricating pump.

The cam 3C will open the switch 3CC at the end of the half load testing period for extinguishing the light 4PL and rendering the vacuum reject circuit ineffective. At the same time cam 6C closes switch 6CC for energizing light 6PL and for establishing a sequence of events which renders the vibration reject, and the dwell reject circuits temporarily ineffective and to re-energize winding SV2A for opening the throttle to place the engine at full load operation. Similarly as occurred at half load, cam 7C closes switch 7CC a predetermined time after closure of switch 6CC which time is sufficient to permit a normal engine to reach full load operation and, providing the engine has reached such power output, the closure thereof is without effect. Attainment by the engine of full load power will again place the reject circuits for vibration and dwell in operation however the manifold vacuum reject circuit will remain ineffective.

Near the end of the full load test period switch 7CC is opened by cam 7C without effect and at the end of the full load period cam 6C opens switch 6CC to extinguish light 6PL. At this time cam 8C opens the contacts 8CCB and closes contacts 8CCA thereby initiating a closure of the engine throttle due to the energization of winding SV2B of solenoid SV2 whereby fluid under pressure is admitted to chamber portion 51 and exhausted from the portion 50 initiating a sequence of operation which will eventually shut down the engine which will stop when the fuel is used up. At the end of a complete revolution of the shaft 12, the cam 1C will again open contacts b and close contacts a of the switch 1CC to de-energize the motor M1.

Returning to the specific operation of the sequence circuit at the time switch 3CC is closed to initiate a half load test period at which time relay 4CR became energized to close its contacts 4CRA and 4CRB. Closure of the contacts 4CRB is a preparatory function in the circuit of the control relay 15CR (vacuum reject circuit). Closure of the contacts 4CRA energizes the winding SV2A for opening the engine throttle as described above. Pressure fluid now flows from the conduit 46 through the fluid strainer OS2, the flow rate controlling valve FR2, and the solenoid valve SV2 into the chamber 50 at a controlled rate whereby the throttle 56 of the engine E is moved toward open position at a predetermined substantially constant rate causing the engine to accelerate. When the engine speed increases to a predetermined desired speed, for example, 1195 R. P. M., the tachometer circuit will act to energize the relay 1WR whereby its normally open contacts are closed to energize the control relay 25CR to close its contacts 25CRB completing the circuit from the line L5 through the now closed contacts 20CRA, the now closed switch 9CC, the now closed contacts 25CRB through the energizing winding of the relay 5CR to the line L6. Energization of the control relay 5CR closes its contacts 5CRA and 5CRB thereby completing an energization circuit for the line control relay LCR from one terminal of the secondary winding of the transformer LCT through the now closed contacts 5CRA through the closed switches 21S and 11S which are interlocked switches which may, for example, be actuated by doors in a protecting housing. The switches 21S and 11S are normally held closed during all times when the doors are closed and the apparatus is in condition for operation. From these switches the circuit may be traced through the control winding of the relay LCR back to the other terminal of the secondary winding of the transformer LCT whereby the line contactor connects the induction generator to the lines U1, U2 and U3. As stated, the output shaft of the engine E is connected to drive the generator IG. The tachometer magneto TM is driven at a speed proportional to that of the generator IG.

The engine E may be coupled to the generator through any suitable coupling arrangement whereby at the desired test speed of the engine E the output frequency of the induction generator is at practically the same frequency as the frequency appearing between the lines L1, L2 and L3. With this arrangement, however, the line frequency will maintain the generator at substantially constant speed irrespective of the energy generated thereby.

Referring now for a moment to the tachometer relay circuit, the tachometer magneto TM is, as indicated, driven in accordance with the speed of the engine E and the induction generator and supplies a potential between the lines L12 and L14 and a revolution per minute meter RPM is connected directly between the lines L12 and L14 and has an indicated needle 80 thereon which is cooperable with suitable indicia 82 to visually indicate the operating speed of the engine. A transformer T20 has its primary windings connected between the lines L4A and L6 and a secondary winding connected to the alternating current input terminals of a full wave dry-disk-type rectifier network 84. The positive direct current output terminal of the network 84 is connected to a line L16 while the negative direct current output terminal of the rectifier network 84 is connected to a line L18. At the predetermined desired engine speed in the illustrated case 1195 R. P. M., the potential generated by the tachometer magneto TM and applied between the lines L12 and L14 will energize the relay 1WR through a circuit which extends from the line L12 through the energizing winding of the relay 1WR, a resistor 1R, a potentiometer 2P through the now closed contacts 22CRA to the line L14. The position of the adjusting arm of the potentiometer 2P is adjustable to determine the exact speed of the magneto TM which causes the relay 1WR to be actuated. Upon actuation of the relay 1WR a circuit will be closed from the line L18 through the normally open contacts of the relay 1WR through the energizing winding of the control relay 25CR to the line L16. Due to transient conditions which may be set up at the time that the line contactor relay LCR is energized to connect the induction generator to the lines L1, L2 and L3 there may be a momentary decrease in potential between the lines L12 and L14. Relay 1WR is therefore preferably of the type in which there is a substantial current differentiation which must flow through the winding 1WR to close its normally open contacts and which current is necessary in the winding to maintain these contacts closed.

To provide a safety overspeed control, a control relay 2WR is also connected between the lines L12 and L14 and is so arranged that it will be energized sufficiently only in the event of a substantial excess in speed of the engine as indicated by a substantially higher than normal potential being applied between the lines L12 and L14. The relay 2WR is further preferably of the type in which when the relay is actuated, so that when once actuated it will stay in its actuated position until intentionally released. This relay 2WR is therefore diagrammatically shown as having a permanent magnet 86 which, after the relay 2WR has been actuated, will hold its armature 88 in its actuated position. This will cause its contacts 2WRA to remain closed and maintain relay 26CR energized through an obvious circuit. The relay 2WR is provided with a resetting winding 90 actuated under control of the contacts 26CRA of relay 26CR and contacts 23CRB of the relay 23CR. When the winding 90 is energized it will exert sufficient pull to cause the armature 88 to move out of the attracting field of the magnet 86. It will be noted that unless excessive speed has occurred the relay 26CR will be de-energized and its contacts 26CRA maintained open to prevent energization of the winding 90 even though the contacts 23CRB are closed. The energizing winding of the relay 23CR may be seen in Fig. 1A and as stated above will be energized whenever the engine E is being operated.

Returning to the functioning of relay 1WR, it will be noted that contacts 22CRA are provided in parallel circuit across a series arranged potentiometer 1P and resistance 3R. Closing of the contacts acts to recalibrate the speed of the magneto at which the relay 1WR will act to open its normally open contacts and close its normally closed contacts for de-energizing the relay 25CR. The induction generator should be removed from the lines U1, U2 and U3 at an engine speed above the synchronous speed of the generator IG which in this instance will be 1200 R. P. M. As stated above this contactor was energized at substantially 1195 R. P. M. which is slightly below the synchronous speed of 1200 R. P. M., and further that in order for the relay 1WR to drop out, the speed of the tachometer magneto TM must be lowered substantially below this 1195 R. P. M. speed of the induction generator. Therefore if the contacts 22CRA are opened prior to the reduction in speed of the induction generator, the presence of the resistor 3R and potentiometer 1P in series with the winding of relay 1WR will increase the voltage required to hold the relay 1WR energized sufficiently so that the relay 1WR will become de-energized at a speed of the tachometer magneto which is sligthly in excess of 1200 R. P. M., for example, 1210 R. P. M. In this manner, the line contactor LCR will be de-energized and disconnect the induction generator IG from lines U1, U2 and U3 prior to any condition in which the induction generator might act as a motor for driving the engine E.

Referring back again to the operation of the sequence circuit, it will be remembered that the induction generator had just been connected to lines U1, U2 and U3 due to the energization of the relay 25CR and closing its contacts 25CRB, shown in Fig. 1B, whereby the control relay 5CR was actuated to energize the line contactor relay LCR. The valve SV2A remains energized permitting additional fluid to flow into the chamber portion 50 and the throttle 56 continues to be moved toward open position increasing the power output of the engine E which power is now being absorbed by the induction generator IG. While the speed of the engine E increases slightly, say, for example, from 1195 R. P. M. to slightly over 1200, possibly 1220 to 1230 R. P. M. depending upon the load characteristics of the induction generator, its speed may for practical purposes be said to remain constant. The energy absorbed by the generator will pass as current to the lines U1, U2 and U3. A portion of the current will flow through the primary winding of the current transformer 3CT located in the line L3 whereby a potential proportional to the generator output will appear across the output terminals of the secondary winding of transformer 3CT. This secondary winding is of the center-tapped type and is connected in a conventional manner through a full wave rectifying valve 1V to provide a D. C. voltage between the lines L20 and L22 of the polarity shown. A condenser 1C is provided between the lines L20 and L22 to provide for a more even output characteristic for the valve 1V.

The current relay circuit also includes valves 2V, 3V, 4V and 5V. The valves 3V and 5V respectively control the energization of the relays 30CR and 31CR which respectively act to de-energize the solenoid winding SV2A at two predetermined horsepower outputs of the engine E. The anode of the valve 2V is connected to one terminal of the secondary winding of the transformer 5T, the primary winding of which is energized between the lines L4A and L6. The other terminal of the secondary winding of the transformer 5T is connected through an impedance network comprising a condenser 3C in parallel with a resistor 12R and in series between this other output terminal of the secondary winding and the cathode of the valve 2V. The control grid of the valve 2V is connected through a resistor 11R to the adjustable contact 92 of the potentiometer 5P having its resistance terminals connected between the busses L20 and L22.

A transformer 4T has its primary winding connected between the lines L4A and L6 and a secondary winding one terminal of which is connected to the cathode of the valve 2V and the other terminal of which is connected through the line L20 and the potentiometer 5P to the control grid of the valve 2V. The polarity of the secondary winding of the transformer 4T is arranged to render the grid sufficiently positive with respect to the cathode to insure conduction of the valve 2V when there is no potential appearing between the lines L20 and L22. As the current flow through the line L3 increases, an increasingly greater and greater positive to negative potential will be applied between the lines L20 and L22 and across the resistor 5R in opposition to the bias placed across the potentiometer 5P by the transformer 4T until such time that the potential appearing between the conductors L20 and L22 will overcome that applied by the transformer 4T and the valve 2V will be rendered nonconductive. The magnitude of this potential between the lines L20 and L22 which is sufficient to accomplish this purpose will be determined by the position of adjustable contact 92. This position in accordance with the operation of the apparatus now being described is adjusted so that the valve 2V will be rendered nonconductive when the output of the engine E is substantially one-half that of rated output.

The valve 3V has its anode connected through the control winding of the relay 30CR to the line L4A and its cathode connected to the line L6 whereby the potential appearing between the lines L4A and L6 will be applied across the valve 3V. It will be noted that the cathodes of the valves 2V, 3V, 4V and 5V are all connected to the line L6 so that all of the cathodes of these valves are maintained at the same potential. The control grid of the valve 3V is connected through the resistor 13R to the common junction of the common connection capacitor 3C and resistor R12 which is connected to the secondary winding of the transformer 5T. Therefore upon conduction of the valve 2V the potential across the resistor 12R will hold the valve 3V blocked. Since the valve 2V is rendered nonconductive at the reaching of half load condition of the engine the valve 3V will upon the reaching of such load condition become conductive and energize the relay 30CR.

Likewise a transformer 6T has its primary winding connected between the lines L4A and L6 and its secondary winding connected to supply potential between the anode and cathode of the valve 4V through the impedance network comprising the parallelly connected capacitor 6C and resistor 15R connected in series between one terminal of the secondary winding of the transformer 6T and the cathode of the valve 4V. The control grid of the valve 4V is connected through the resistor 14R to the movable contact member 94 of the potentiometer 6P having its resistance winding connected between the lines L20 and L22. It will be noted that since the cathode of the valve 4V is connected to the line L6 as is one terminal of the secondary winding of the transformer 4T, the transformer 4T will also act to place a bias voltage between the control grid and cathode of the valve 4V so that the valve 4V with less than full load output of the generator 1G is held in a conducting condition setting up a potential drop across the resistor 15R which is applied between the control grid and cathode of the valve 5V to maintain the valve 5V nonconductive. As was the case with valve 2V, the potential appearing between the lines L20 and L22 opposes the potential applied by the transformer 4T between the control grid and cathode of the valve 4V so that, upon a predetermined potential therebetween which may be placed thereon with the current flowing through the line L3 representative of a full load output of the engine E, the valve 4V will become blocked permitting the valve 5V to conduct. Since the anode and cathode of the valve 5V are connected in series with the control winding of the relay 31CR and this series circuit is connected between the lines L4A and L6, conduction of the valve 5V will operate the relay 31CR which operation will open its contacts 31CRA to de-energize winding SV2A to prevent further fluid from being supplied to the chamber 50 for moving the throttle toward a further open position.

The position of the adjustable arm 94 of the potentiometer 6P is so chosen that the valve 4V is rendered nonconductive substantially as the full load output power is being delivered by the engine. It may, of course, be adjusted for any power output above that for which the arm 92 is adjusted.

It will be noted that the network comprising the condenser 3C and resistor 12R is what is known as an RC network and there will be a certain predetermined time rate of discharge of the condenser 3C as it discharges through the resistor 12R upon blocking of the valve 2V. The values of the capacitor and resistor are preferably so chosen in this instance that the potential drop across the capacitor 3C will be lagging sufficiently to permit conduction of the valve 3V in about one-quarter to one-half a second from the time that the valve 2V is rendered nonconductive. It is to be observed that the de-energization of the winding SV2A does not occur until the valve 3V conducts so that the throttle 56 will be moved to a little further opened position than one-half load position as determined by the setting of the flow regulating valve FR2. Likewise the same type of RC constant is found in condenser 6C and resistor 15R of delaying operation of the valve 5V. These RC constants may be varied to meet the particular conditions desired but in the particular use of automotive engines, the position of the flow regulating valve FR2 may be so chosen that the horsepower increase of the engine subsequent to blocking of the valves 2V or 4V and prior to rendering the valves 3V or 5V conductive will represent about eight to ten percent of the rated horsepower output of the engine E being tested. This is because in production automotive engine testing for which this apparatus is particularly adapted, it is commercially undesirable to regulate the engines with sufficient accuracy so that they will deliver an absolute fixed horsepower output but such output may vary a few percent. If the opening of the throttle were set at exactly half load such normal variation in the horsepower output of the engine might cause a reject to occur for low power.

At the time the contacts 30CRA opened to de-energize the winding SV2A, contacts 30CRB opened. Such opening is normally without effect since the normally open switch 4CC is not closed by the timer ST1 until a normal engine E has had sufficient time to accelerate to the desired speed and to build up its output to the desired half load speed. In this regard, it will be noted that the normally closed switch 7CC is being held open by the cam 7 so that the relay 7CR cannot be energized by the normally closed contacts 31CRB. The sequence of timing between closure of switch 4CC by the timer ST1 and opening of contacts 30CRB by the engine is such that a normal engine will attain one-half load condition and open contacts 30CRB prior to the timer closing switch 4CC whereby low power reject relay 7CR will not act to indicate a reject.

Assuming that the engine has come up to half load in the desired time and the relay 30CR is energized to open the contacts 30CRB in time to prevent operation of relay 7CR, the contacts 30CRA will open to de-energize the control relay 21CR permitting its contacts 21CRB to close. At this time the contacts 5CRB will be closed so that closure of contacts 21CRB energizes the relay 6CR causing its contacts 6CRA, 6CRB and 6CRC to close. Closure of the contacts 6CRA will prepare a circuit from the switches VS1 and VS2 through the now closed contacts 4CRB, the now closed contacts 6CRA, the energizing winding of the relay 15CR to the line L6 and also through the pilot light 13PL connected in parallel with the control winding of the relay 15CR which will be energized upon closure of either switch VS1 or VS2. However, if the manifold vacuum is within predetermined limits both of the switches VS1 and VS2 will remain open and no energization of the manifold vacuum reject relay 15CR will occur. Similarly, the closure of the contacts 6CRB closes a preparataory circuit for the energizing winding of the relay 16CR which will be energized upon closure of the vibration sensitive switch VIS for energizing the relay 16CR to indicate a vibration reject and to light the pilot light 14PL similarly as the control relay 15CR was operable to light the pilot light 13PL. Similarly, closure of the contacts 6CRC completes a preparatory circuit for the energizing winding of the relay 17CR so that upon closure of the contacts 36CRA in response to a reject distributor contact dwell condition as reflected by the relay 36CR in the dwell-reject-stop-circuit shown in Fig. 1E, the pilot light 15PL will light to indicate a reject condition due to too long closure or too short closure of the primary contacts 100 of the engine distributor.

Energization of the relay 2CR as described above in connection with the energization of the timer ST1 closed contacts 2CRA, 2CRB and 2CRC closing preparatory reject circuits. Contacts 2CRA prepared the lubricant reject circuit whereby the relay 12CR and pilot light 10PL may be energized upon closure of low pressure switch PS3 or high pressure switch PS2. Contacts 2CRB prepared the coolant flow reject circuit whereby the relay 13CR and pilot light 11PL may be energized upon closure of the switch PS1 which is responsive to a restricted coolant flow. Closure of contacts 2CRC prepares the coolant high temperature reject circuit whereby the relay 14CR may be energized upon closure of switch TS1 in response to a high coolant temperature.

After eight minutes of the time period of the half load operation has passed, cam 5C will momentarily permit the switch 5CC to close to complete a circuit from the line L5 through the now closed contacts 1CRC, the switch 5CC and the energizing winding of the relay 8CR to the line L6. Energization of the relay 8CR closes its contacts 8CRA and 8CRB. Closure of the contacts 8CRA completes a holding circuit for the relay 8CR about the switch 5CC whereby subsequent rotation of the cam 5C which causes the switch 5CC to again open, is without effect upon operation of the relay 8CR. Closure of the contacts 8CRB establishes an energizing circuit for the solenoid valve SV3 leading from the line L5 through the contacts 8CRB and the energizing winding of the solenoid SV3 to the line L6.

Energizing of the solenoid SV3 permits oil to flow from the conduit 46 through the oil strainer OS2 through the flow rate valve FR1 to the lower cylinder portion 150 of the piston cylinder assembly 152 to permit the piston 154 thereof to move upwardly to close the oil drain 56 of the engine E. Oil from the engine is thereby prevented from flowing outwardly into the sump 58 and commences to accumulate in the crankcase of the engine E. The annular opening in the member 64 is connected by the conduit 65 which is connected to the pressure switch PS7 whereby it is sensitive to the head of oil in the engine crankcase. Upon the occurrence of a pedetermined head of oil in the engine crankcase the switch PS7 will open de-energizing the solenoid valve SV1 preventing further flow of oil to the engine from the conduit 46. The engine will now continue operating under lubricant circulated by its own pressure pump circulated from the crankcase. The pressure of the recirculated oil will be applied to the switches PS2 and PS3 through conduit 52.

At the end of the one-half load period, the shaft 12 will have been rotated sufficiently by the motor M1 whereby the actuator 20 thereof will again ride on the reduced radius cam portion 14 of the cam 4C permitting the switch 4CC to move to its normal or open position. The opening of the switch 4CC is without effect since at this time the circuit to the solenoid 7CR will be broken due to the open condition of the contacts 30CRB as described above.

At about this same time the follower 20 of the switch 3CC will ride up the incline 18 onto the large radius cam portion 14 moving the normally closed switch 3CC to open position. Opening of the switch 3CC terminates a half load period extinguishing the indicating pilot light 4PL and also de-energizing the relay 4CR. De-energization of the relay 4CR opens its contacts 4CRA and 4CRB. Opening of the contacts 4CRA is without effect since at this time the contacts 30CRA are open and previously the solenoid valve SV2A and the relay 21CR were de-energized. Opening of the contacts 4CRB terminates the testing of manifold vacuum and is a preparatory step prior to opening of the throttle for increasing the load on the engine E from one-half load to the full load operation condition, it being evident that during the period of load increase, the manifold pressure and the operation of the engine at increased loads will not be that which would exist under the operating conditions just described.

At almost the same time that cam 3C actuated switch 3CC for terminating the half-load test, cam 6C moves switch 6CC and closes its contacts. Closure of the switch 6CC establishes a circuit from the line L5 through the energizing winding of the control relay 9CR to the line L6 and also through the full load test pilot light 6PL which is connected parallel with the relay 9CR. Closure of the contacts 9CRA will establish a circuit from the line L5 through the now closed contacts 31CRA, the contacts 9CRA and through the energizing winding SV2A of the solenoid SV2 and through the parallelly connected energizing winding of the relay 21CR and the energizing winding of the solenoid SV2A to the line L16 which is connected to the line L6 through the normally closed contacts 10CRB. Energization of the solenoid winding SV2A will again permit fluid to flow into the chamber portion 50 pushing the piston rod 54 upwardly to move the throttle 56 toward open position at a predetermined rate determined by the flow rate valve FR2.

Energization of the relay 21CR opens the normally closed contacts 21CRB thereby de-energizing the relay 6CR whereby its contacts 6CRA, 6CRB and 6CRC are opened preventing any energization of the reject relays 15CR, 16CR and 17CR connected respectively with the manifold reject, the vibration reject and the dwell rejection so that they are ineffective to indicate any rejection during the accelerating period to full load operating condition. As the throttle 56 is moved toward open position, the electrical energy generated in the induction generator will increase causing a greater current to flow through the line L3 and through the current transformer 3CT therein. The output of this current transformer 3CT will increase and will be rectified by the valve 1V causing an increase in potential to be applied between the lines L20 and L22. Increase in potential between the lines L20 and L22 will decrease the potential of the grid with respect to the cathode of the valve 4V sufficiently so that the valve 4V will be rendered nonconductive and the potential across the capacitor 6C will discharge through the resistor 15R removing the blocking bias on the valve 5V permitting it to conduct and energize the relay 31CR through an obvious circuit. Energization of the relay 31CR will open its contacts 31CRA and 31CRB. Opening of the contacts 31CRA de-energizes the circuit from the line L5 to the control relay 21CR and the solenoid valve SV2A. De-energization of the solenoid valve SV2A terminates the flow of lubricant to the piston cylinder assembly 52 whereby further opening of the throttle 56 will be prevented and the throttle will be maintained in this set position. Opening of the contacts 31CRB will prevent energization of the control relay 7CR due to closure of the switch 7CC which will occur a predetermined timed interval after the start of the accelerating period from half load to full load similarly as the contacts 30CRB opened before closure of the switch 4CC.

At the end of this predetermined timed interval after the initiation of the full load time period, the follower 20 riding on the cam 7C will permit the held open switch 7CC to move to its closed position. If the engine is up to standard, closure of the switch 7CC is without effect.

De-energization of relay 21CR permits its contacts 21CRB to close again energizing relay 6CR causing contacts 6CRA, 6CRB and 6CRC to close to prepare the reject circuits for response to a faulty vibration or distributor breaker point dwell operation. The now open contacts 4CRB prevent any operation of the manifold vacuum reject circuit.

Assuming now that the engine has come up to power within the required time, as is determined by the sequence timer ST1 in its actuation of the switch 7CC, the test apparatus and engine will continue to operate throughout the full load period unless a reject occurs. At the end of this time interval, cam 6C will operate the normally closed switch 6CC to open position and cam 7C will also operate the normally closed switch 7CC to open position. Opening of the switch 6CC de-energizes relay 9CR and light 6PL. De-energization of relay 9CR is without effect since contacts 31CRA were previously opened as described above. Opening of switch 7CC is without immediate effect since contacts 31CRB were previously opened as described above but does serve to prevent a reject indication during the load decreasing time of the engine.

The idle period will be initiated by the movement of the cam 8C which will permit the switch 8CC to move to normal position, closing its contacts 8CCA and opening its contacts 8CCA. Closure of the contacts 8CCB establishes an energizing circuit for the idle time period pilot light 7PL and it also energizes the solenoid valve SV2B through the now closed contacts 10CRA. Energization of the solenoid SV2B opens the oil line 46 into the upper chamber section 51 of the piston cylinder assembly 52 causing the piston therein to move downwardly whereby the throttle 56 is moved toward engine idling position.

Opening of the contacts 8CCB de-energizes the control relay 22CR whereby its contacts 22CRA open inserting the resistance of the potentiometer 1P and the resistance 3R in series with the resistance 1R and the potentiometer 2P whereby the voltage required to maintain 1WR energized is substantially raised so that as the engine speed decreases, and consequently the speed of the tachometer magneto TM, the minimum potential required to maintain the relay 1WR energized will occur at a speed slightly above the synchronous speed of the induction generator which in the event of a synchronous speed 1200 R. P. M. could be 1210 R. P. M. As the speed of the induction generator and tachometer magneto decreases the relay 1WR will become de-energized permitting its normally closed contacts to close and its normally open contacts to open whereby the control winding of the relay 25CR is shorted out to de-energize a relay 25CR. A resistance 2R is placed in series circuit with the holding contacts of the relay 25CRA so that upon closure of the shorting contacts of the relay 1WR a direct short will not be placed across the output of the rectifying network 84.

De-energization of the relay 25CR opens its contacts 25CRA and 25CRB. Opening of the contacts 25CRB de-energizes the relay 5CR whereby its contacts 5CRB and 5CRA open. Opening of the contacts 5CRA de-energizes the circuit of the line control relay LCR whereby the lines L1, L2 and L3 are opened disconnecting the induction generator from the power supply or load lines U1, U2 and U3. Opening of the contacts 5CRB de-energizes the relay 6CR whereby its contacts 6CRA, 6CRB and 6CRC are opened to prevent any subsequent actuation of the reject relays 15CR, 16CR and 17CR.

As the output of the induction generator decreased, the valves 4V and 2V were progressively energized and blocked their associated valves 5V and 3V respectively to de-energize the relays 30CR and 31CR. De-energization of the relay 30CR closes its contacts 30CRA and 30CRB while de-energization of the relay 31CR closes its contacts 31CRA and 31CRB. Closure of the contacts 30CRA is without effect since at this time the contacts 4CRA will be opened and closure of the contacts 30CRB will be without effect since at this time the cam 4C is permitting the normally open switch 4CC to be in its open position. Closure of the contacts 31CRA will be without effect since at this time the contacts 9CRA are open while closure of the contacts 31CRB will be without effect since at this time the normally closed switch 7CC will be held in open position by cam 7C. Sometime subsequent to the actuation of switch 8CC and preferably after the relay 25CR has been de-energized as a result of lowering engine speed, the cam 9C opens switch 9CC to prevent any reclosure of the line contactor relay LCR for reconnection of the induction generator IG to lines U1, U2 and U3.

During the idle period the normally closed switch 10CC is allowed to momentarily close thereby closing a circuit from the line L5 through the line L36 and the energizing winding of the relay 10CR to the line L6, and also through the energizing winding of the relay 11CR to the line L6 whereby the relays 10CR and 11CR are energized. Energization of the relay 10CR closes its contacts 10CRB and 10CRC and opens its contacts 10CRA and 10CRD. Closure of the contacts 10CRB completes a holding circuit for the relays 10CR and 11CR through the now closed contacts 23CRA. Closure of the contacts 10CRC again energizes the solenoid valve SV2B whereby if the piston rod 54 has not already been moved downwardly to idle position, it is so moved. Opening of the contacts 10CRA is without effect since the solenoid valve SV2B is now energized through contacts 10CRC. Opening of the contacts 10CRD de-energizes the line L16 and all circuits supplied thereby. The opening of contacts 10CRA prevents a feedback through the pilot light 7PL. The re-energization of the solenoid valve SV2B is a safety feature to assure that the throttle angle is decreased to the idle level. The opening of contacts 10CRD insures the de-energization of the solenoid valve SV2A, and de-energizes the solenoid valve SV6 which controls the flow of fuel to the engine.

Energization of the relay 11CR opens its contacts 11CRA, 11CRC and 11CRD. Opening of the contacts 11CRA prevents any energization of the low power reject relay 7CR. Opening of contacts 11CRC de-energizes the relay 2CR whereby its contacts 2CRD shunting the B contacts of the switch 1CC are opened. Opening of the contacts 11CRD opens the shunting circuit about the contacts 35CRB which will remain closed as long as the engine E is running since relay 35CR will be maintained energized until the engine E stops. De-energization of the relay 2CR also caused its contacts 2CRA, 2CRB and 2CRC to open whereby any further rejects due to oil pressure, water flow and water temperature cannot occur. Although the gasoline valve SV6 is closed the engine will continue to run until the carburetor is empty. By this time, the ST1 timer will have completed its complete cycle and the finger 20 of the 1CC switch will engage the cam portion 16 of the cam 1C permitting its contacts B to open and its contacts A to close. Opening of the contacts B opens the holding circuit through the contacts 3CRA of the relay 3CR whereby this relay is de-energized. De-energization of the relay 3CR opens the circuit through the motor M1 of the sequence timer ST1 and the timer stops. Closure of the contacts A of the switch 1CC prepares a circuit to the motor M2 of the standby timer ST2. A circuit for the solenoid 182 controlling engagement of the clutch plates 184 and a circuit for the pilot light 8PL are connected in parallel with the motor M2 and solenoid 182. At this time, however, the contacts 11CRD are open due to the energized condition of the relay 11CR.

The engine E will continue to run until all of the gasoline is drained from the carburetor after which it stops. Stopping of the engine causes the valve 10VB to conduct blocking the valve 14V and de-energizing the relay 35CR. Opening of the contacts 35CRB de-energizes the relays 1CR and 23CR. De-energization of the relay 1CR opens its contacts 1CRA, 1CRB, 1CRC and 1CRD. Opening of the contacts 1CRA de-energizes the shunting circuit for the switch 1PB whereby the relays 1CR and 23CR will not be re-energized until closure of the switch 1PB. Opening of the contacts 1CRC opens the holding circuit for the relay 8CR. Opening of the contacts 1CRD is without effect since the solenoid SV6 was already de-energized due to the open condition of the contacts 10CRD of the relay 10CR. Opening of the contacts 1CRB opens the circuit to the ignition system of the engine E de-energizing the same. De-energization of the relay 23CR opens its contacts 23CRA and closes its contacts 23CRB. Opening of the contacts 23CRA acts to de-energize the relays 10CR and 11CR.

De-energization of the relay 10CR opens its contacts 10CRB and 10CRC and closes its contacts 10CRA and 10CRD. Opening of the contacts 10CRB is without effect. Opening of the contacts 10CRC de-energizes the solenoid valve SV2B. Closure of the contacts 10CRA is without effect since at this time the contacts 8CCA will be open. Closure of the contacts 10CRD reconnects the line L16 to the line L6 further preparing the circuits for the motor M2, the solenoid 182 and the pilot light 8PL. De-energization of the relay 11CR causes its contacts 11CRA, 11CRC and 11CRD to close. Closure of the contacts 11CRA is without effect since at this time the switches 4CC and 7CC will be open. Closure of the contacts 11CRC is without effect since the switch 3PB is now open.

Closure of the contacts 11CRD completes the energizing circuit for the circuits associated with the off or standby timer ST2. Energization of the motor M2 causes its shaft 180 to rotate and drive the shaft 186 since the clutch plates 184 are now held in engagement by the energized solenoid 182. The engine E is then removed by disconnecting the various fuel, coolant, and lubrication connections and a new engine substituted after which the apparatus may be retested in the manner recited above.

If after a predetermined time subsequent to the energization of timer ST2 a new test engine has not been placed on the stand and its testing initiated, the arm 188 will engage the switch SW1 opening its normally closed contacts SW1A and closing its normally open contacts SW1B. Opening of the contacts SW1A de-energizes the motor M2 and closure of the contacts SW1B energizes the pilot light 9PL. The timer ST2 will remain in this position until the circuit thereto is broken due to opening of the contacts A of the switch 1CC. The illumination of pilot light 9PL indicates that the test stand or test apparatus has been down for an unduly long period since the termination of the last engine test run.

The occurrence of the first reject during the testing cycle will act to render the remainder of the reject circuits ineffective to indicate a subsequent reject condition, will shut down the timer ST1 at the position in which it happens to be at the time the reject occurred, and will shut down the engine.

For example, assume that the engine did not come up to one-half load within the allotted time and the timer ST1 closed the switch 4CC prior to the energization of the relay 30CR. The closure of the switch 4CC will energize the control winding of the relay 7CR from a circuit which extends from the line L5 to the switch 4CC through the contacts 30CRB, the energizing winding of the relay 7CR, the normally closed contacts 11CRA of the relay 11CR back to the line L6. A pilot light 5PL connected in parallel with the control winding of the relay 7CR will be illuminated to indicate visually that the engine has not been able to make rated horsepower output in the desired time.

Energization of relay 7CR closes its contacts 7CRA and 7CRB. Closure of the contacts 7CRB establishes a circuit in parallel with the now closed contacts 11CRA so that subsequent energization of relay 11CR and opening of contacts 11CRA will not effect the operation of relay 7CR. Closure of the contacts 7CRA establishes a circuit from the line L5 through the now closed contacts 20CRB, contacts 7CRA, the windings of the relays 10CR and 11CR to line L6.

Energization of the relay 11CR opens its contacts 11CRA without effect since energization of relay 7CR closed its contacts 7CRB and established a holding circuit around contacts 11CRA. If relay 11CR had been energized by another rejection, opening of contacts 11CRA would prevent energization of the control relay 7CR and pilot light 5PL. Energization of the control relay 11CR also opens its contacts 11CRC and 11CRD. Opening of the contacts 11CRC de-energizes the control relay 2CR to prevent the sequence circuit from indicating rejects due to pressure conditions of the lubricant and coolant and also temperature conditions of the coolant. Opening of the contacts 11CRD is without immediate effect since contacts 35CRB will now be closed. Energization of the relay 10CR opens its contacts 10CRA and 10CRD and closes its contacts 10CRB and 10CRC. Opening of the contacts 10CRD de-energized the line L16 and consequently the solenoid SV6 whereby further flow of fuel to the engine carburetor is terminated and de-energizes relay 6CR whereby its contacts 6CRA, 6CRB, and 6CRC open to render the reject circuits associated therewith ineffective to indicate a reject condition. Opening of contacts 10CRD further de-energizes relay 22CR whereby its contacts 22CRA open to insert the resistance of 1P and 3R in the circuit of relay 1WR with the result that the speed at which 1WR is de-energized is increased with the results as stated above. After the fuel in the carburetor is exhausted, the engine will stop de-energizing the relay 35CR and opening the contacts 35CRB. Opening of contacts 35CRB de-energizes the relays 1CR, 3CR and 23CR, 2CR having been de-energized by opening of contacts 11CRC. Opening of the contacts 10CRA prevents feedback to light 7PL. Closure of the contacts 10CRB establishes a holding circuit for relays 10CR and 11CR and closure of contacts 10CRC energized winding SV2B to close the engine throttle.

As stated, stopping of the engine de-energized the relays 1CR, 3CR and 23CR. De-energization of relay 3CR removed the holding circuit for the motor M1 of the timer ST1 which stops in its position at the time of reject and must be manually reset. De-energization of relay 23CR opens the contacts 23CRA de-energizing relays 10CR and 11CR and closes the contacts 23CRB for resetting of the relay 2WR if the relay has been energized due to overspeed. De-energization of 1CR opens its contacts 1CRA, 1CRB, 1CRC and 1CRD. Opening of 1CRA breaks the holding circuit for relay 23CR, opening of 1CRC de-energizes 8CR whereby winding SV3 is de-energized to permit the oil to drain from the engine crankcase. Opening of contacts 1CRD is without effect except to prevent re-energization of the fuel valve SV6. Opening of contacts 1CRB de-energizes the engine ignition.

If an authorized operator desires to operate the test stand to study the operation of a rejected engine, the key operated switch KS1 is opened by a proper key thereby de-energizing the relay 20CR opening its contacts 20CRA, 20CRB and 20CRC. Opening of contacts 20CRA prevents energization of relay 5CR and thereby the energization of line contactor relay LCR to connect the induction generator IG to the lines U1, U2 and U3. This also prevents energization of relay 6CR to open the reject circuits for manifold vacuum, vibration and dwell. Opening of contacts 20CRB opens the circuits to relays 10CR and 11CR to prevent their functioning to shut down the apparatus. Opening of contacts 20CRC opens the lock in circuits for the relays 12CR, 13CR, 14CR, 15CR, 16CR and 17CR thus resetting the reject circuit which caused the original reject. If 7CR caused the reject it will be reset by the resetting of the timer ST1.

The timer ST1 may be automatically operated as described above or may be manually operated by the authorized operator by means of a key in the lock KS2. This timer ST1 should be reset to initial position, then switches 1PB and 2PB should be momentarily closed in succession as described above in connection with normal test procedure. 3PB should not be closed but the key KS2 should be used to turn the timer ST1 into the no load quadrant.

Each of the reject circuits is provided with relays which close contacts in series with the contacts 20CRB whereby upon the occurrence of a reject condition from any cause the relays 10CR and 11CR will be energized as above described in connection with the described reject for low power output to shut down the engine and the timer ST1. Each of the reject relays are provided with B contacts for maintaining them energized, even though the reject signal disappears, so that the reject indicating lights will remain energized.

More specifically, when the manifold vacuum is below or above predetermined limits the switches VS1 or VS2 respectively will be closed and the relay 15CR energized indicating a reject for manifold pressure being outside a predetermined limit. If such a reject condition occurs the contacts 15CRB and 15CRA will close. Closure of the contacts 15CRB completes a holding circuit for the energizing winding of the relay 15CR extending from a line L32 through the now closed contacts 15CRB and the energizing winding of the relay 15CR through the line L6 and also from the enclosed contacts 15CRB through the pilot light 13PL to the line L6 so that when actuated the relay 15CR will remain actuated as long as potential is supplied to the line L32. Closure of the contacts 15CRA completes a circuit from the line L5 through the closed contacts 20CRB through the now closed contacts 15CRA through the line L34, line L35, line L36, the energizing winding of the control relay 10CR to the line L6 and also through the energizing winding of the relay 11CR to the line L6 whereby the relay 10CR and 11CR will be actuated. Potential for the line L32 is continually maintained through the closed contacts 20CRC which connect the line L32 to the line L5. Energization of the relay 10CR opens its normally closed contacts 10CRA and 10CRD and closes its normally open contacts 10CRB and 10CRC. At this time relay 23CR is energized, a holding circuit for the relay 10CR will be established from the line L5 to the closed contacts 23CRA, the now closed contacts 10CRB, the energizing winding of the relay 10CR to the line L6. Current will also flow from the closed contacts 10CRB through the closed contacts 10CRC and the energizing winding of the solenoid valve SV2B to the line L6 whereby the valve SV2 is actuated to supply fluid under pressure to the upper chamber portion 51 moving the piston therein downwardly closing the throttle 56. Energization of the control relay 11CR opens its contacts 11CRC and 11CRD for the purposes described above for de-energizing the control relay 2CR to prevent other reject conditions from being indicated and for de-energizing the control relays 18CR and 19CR to shut the engine down.

Similarly, upon the occurernce of excessive engine vibration the switch VIS which may be a mercury tube will energize relay 16CR which closes its contacts 16CRA and 16CRB. Contacts 16CRB close a holding or locking circuit to maintain relay 16CR energized while contacts 16CRA energize the relays 10CR and 11CR as above described.

The contacts 36CRA are controlled by the dwell-reject-stop-circuit shown in Fig. 1E. This circuit includes the valves 6V, 7V, 8V, 9V 10VA, 10VB, 11V, 12V and 13V. The input signal is communicated to the dwell-reject-stop-circuit of Figs. 1E and 1F by means of the line L50 which is connected to the control grid of the valve 9V through the resistor 24R. Its other end, as shown in Fig. 1D, is connected to the ungrounded terminal of the switch 100. The cathode of the valve 9V is connected by means of conductor L52 to the line L54 and therethrough to ground whereby the potential appearing between the ungrounded contact of the switch 100 and ground will be applied between the grid and cathode of the valve 9V for controlling conductivity thereof. Electrical energy for operating the valves 6V through 10VA inclusive is supplied from a transformer 7T having its primary winding connected between the lines L4A and L6. The secondary winding of the transformer 7T is of the center tap variety and the two end terminals whereof are connecetd to the anodes of the full wave rectifying valve 6V. The center tap connection of this secondary winding is connected to the negative bus L56. The cathode of the valve 6V is connected to the positive D. C. bus L58. A condenser 10C is connected between the lines L56 and L58 to smooth the output of the rectifying valve 6V. Grid-glow valves 7V and 8V are connected in series between the lines L56 and L58 and are effective to maintain a substantially constant voltage thereacross. A resistor 21R is connected in the line L58 intermediate the connection of the valve 8V therewith and the connection of the line L58 to the cathode of the valve 6V.

The cathode of the valve 7V is connected directly to the line L56. A pair of series connected resistors 23R and 22R are connected in parallel across the valve 7V, the free end of the resistor 23R being connected to the line L56 and the free end of the resistor 22R being connected to the common point 101 of the valves 7V and 8V. The anode of the valve 9V is connected through the dwell indicator DI which may be a milliammeter or other suitable current measuring device and through the potentiometer 12P to the line L58. This meter DI is calibrated to give a visual indication of the percentage contact dwell of the distributor breaker points. The cathode of the valve 9V is connected to the common point 101 so that the potential appearing across the valve 8V will also appear across the valve 9V and the potential across the valve 9V will be maintained substantially constant because of the controlling action of the valve 8V.

A valve 10VA has its anode connected through a resistor 28R to the line L58. The cathode of this valve 10VA is connected to the common point 101 through an obvious circuit so that the potential appearing across the valve 10VA and the resistor 28R will be the same as that appearing across the valve 8V and will be substantially constant. When the contacts of the switch 100 are closed, the potential of the grid and cathode of the valve 9V will be substantially the same and the valve 9V will be conductive. Upon opening of the contacts of the distributor switch 100, a negative bias will be placed upon the grid of the valve 9V with respect to the cathode thereof and the valve 9V will be held in a blocked condition. It will therefore be seen that conduction through the valve 9V will be in substantially direct accordance with the closure and opening of the contacts of the switch 100, the valve 9V conducting when the contacts of the switch 100 are closed and will be blocked when the contacts thereof are open. The grid of the valve 10VA is connected through a resistor 27R to the common point of the resistors 22R and 23R. Since the cathode of the valve 10VA is connected to the common point 101 and to the opposite terminal of the resistor 22R, the potential appearing across the resistor 22R will also appear between the grid and cathode of the valve 10VA. One terminal of a resistor 26R is connected to the common point between the dwell indicator DI and the potentiometer 12P. The other terminal thereof is connected to one terminal of a resistor 27R and also to the grid of the valve 10VA. The potential of the grid of the valve 10VA with respect to the cathode thereof will then be determined by the relative potential drop across the resistors 22R and 23R and in accordance with the conductive condition of the valve 9V.

Upon conduction of the valve 9V, the potential of the terminal of the resistor 26R connected intermediate the dwell indicator DI and the potentiometer 12P will approach that of the potential of the common point 101 and since the potential of the grid of the valve 10VA is below the potential of this common point between the dwell indicator DI and the potentiometer 12P the valve 10VA will be rendered nonconductive during periods when the valve 9V is conductive. Conversely when the valve 9V is nonconductive the common point between the dwell indicator DI and the potentiometer 12P will approach that of the line L58 and consequently the grid of the valve 10VA will be raised sufficiently in potential to permit conduction of the valve 10VA.

Due to the fact that opening and closing of the contacts of the switch 100 do not produce a pure instantaneous biasing condition on the grid of the valve 9V with respect to the cathode but contain what is known in the art as "hash," the output characteristic wave of the valve 9V may not be, as desired, a nearly square-shaped wave, the area under which will be proportioned to the closed time of the switch 100, and therefore will be sufficient to actuate the valve 10VA which will have a more nearly square wave-shaped form, the area under which will be proportional to the open time of the contacts of the switch 100. Connected in parallel with the resistance 28R are series arranged capacitor 13C and inductance 10T. Since during conductive intervals of the valve 10VA, a potential will appear across the resistance 28R, a similar potential will appear across the series connected capacitor 13C and inductance 10T. With an RC constant which is high the capacitor 13C will assume an average charge which is dependent upon the average time that the valve 10VA is conductive. The charge across the capacitor 13C is applied as a bias potential between the control grid and cathode of the valve 12V.

Connected in parallel with the capacitor 13C are a series connected resistor 42R, a potentiometer 13P, and a resistor 29R. The movable arm 102 of the potentiometer 13P is connected through resistor 30R to the control grid of the valve 11V. The cathode of the valve 11V is connected by means of conductor 104 to the cathode of the valve 12V and through the filment of the valve 12V to lines 106 and 108 which are connected respectively to movable arms 110 and 112 of potentiometers 11P and 14P respectively. One terminal of the resistance winding of the potentiometer 11P is connected through a resistor 40R to a conductor 114 connected to the line L58 and therethrough to one terminal of the capacitor 13C so that a portion of the charge of the capacitor 13C will appear as a bias potential between the control grid and cathode of the valve 11V. The other terminal of the resistance element of potentiometer 11P is connected through a resistor 41R to the line L60 which is connected to the common point 100. In this manner the potential appearing across the valve 8V is applied between the lines L60 and L58 in a negative to positive manner respectively whereby the potentiometers 11P and 14P are arranged to provide an adjustable bias potential for adjusting the relative potentials of the line L58 and the cathode of the valves 11V and 12V.

The filament of the valve 12V is connected to a suitable alternating current filament transformer having output terminals adapted to provide a fixed voltage for operating the filament which may be, for example, 6 volts and which is phased oppositely to the phase of the alternating potential supplied between the anode and cathode of the valve 12V by means of the transformer 11T2 having its primary winding connected between the lines L4A and L6. In this manner a negative biasing potential is applied between the cathode and control grid of each of the valves 11V and 12V which will vary slightly in accordance with changes in magnitude of line voltage between the lines L4A and L6.

Due to the action of the potentiometers 11P and 14P supplied with energy between the lines L58 and L60, a slightly positive potential will be placed between the grid and cathode of the valves V11 and V12 when there is long dwell or long time closure of the contacts of the switch 100 and consequently substantially no charge across the capacitor 13C. The valve 12V will have the greatest tendency to conduct and will conduct establishing a potential across the network comprising the resistor 34R and capacitor 17C connected in parallel with each other and in series between the cathode of the valve 12V and one terminal of the resistor 33R, the other terminal of which is connected to one terminal of the secondary winding of the transformer 11T2. Since the cathodes of the valves 11V and 12V are tied together and the suppressor grid of the valve 11V is connected by means of conductor 116 to the common point between the resistors 33R and 34R, a negative blocking bias will be placed on the valve 11V and it will remain nonconductive while the valve 12V will remain conductive. The anode of the valve 13V is connected through the energizing winding of the relay 36CR to one terminal of the secondary winding of a transformer 12T, the other terminal of which is connected to the cathode of the valve 13V. The primary winding of the transformer 12T is connected between the lines L4A and L6. The control grid of the valve 13V is connected by means of conductor 118 to the common terminal between capacitor 15C and resistor 39R and since the cathode of the valve 13V is as stated electrically connected with the cathode of the valve 11V or to the other side of the capacitor 15C any potential appearing across the capacitor 15C will appear as a bias potential between the grid and cathode of the valve 13V. Since under the conditions stated valve 11V is nonconductive there will be no potential appearing across the capacitor 15C and the valve 13V will be conductive for energizing the control relay 36CR.

As the engine operates, the switch 100 will be open and closed and the valve 9V and 10VA will act to conduct current over a time period which is proportional to the percentage dwell of the contacts of the switch 100. At very high percentage dwell a very low percentage will appear across the capacitor 13C whereby the valve 12V will conduct and maintain the valve 11V nonconductive and permit the valve 13V to conduct energizing the relay 36CR whereby its contacts 36CRA (Fig. 1C) are closed and if contacts 6CRC of the relay 6CR are also closed the reject relay 17CR will be energized initiating a reject for high dwell periods. If, however, the dwell of the contacts is within predetermined limits a sufficient charge will appear across the capacitor 13C which charge will render the valve 12V blocked since the charge across the capacitor 13C tends to place a negative bias between the grid and cathode of the valve 12V. Since only a portion of the potential across the capacitor 13C appears between the grid and cathode of the valve 11V as determined by the setting of the arm 102 of the potentiometer 13P the valve 11V under these conditions will be conductive since the potential across the capacitor 13C has not as yet risen sufficiently high to block this valve and the valve 12V is held blocked itself so that it can not place a blocking bias on the suppressor grid of the valve 11V. Under these conditions valve 11V conducts setting up a potential across the capacitor 15C which is reflected between the control grid and cathode of the valve 13V as a blocking bias whereby the valve 13V is held nonconductive and the relay 36CR is held de-energized whereby the contacts 36CRA thereof are held open and prevent energization of the control reject relay 17CR.

Should the percentage dwell of the contacts of the switch 100 decrease still further the charge on the capacitor 13C will increase still more and will increase sufficiently to finally place a blocking bias on the valve 11V whereby both valves 11V and 12V will be held blocked. Blocking of the valve 11V, as stated above, will permit the valve 13V to conduct to energize the relay 36CR whereby its contacts 36CRA close to initiate a reject operation of the reject control relay 17CR. Summarizing, it may be said that at periods of high dwell of the contacts, valve 12V will be held conductive blocking valve 11V permitting valve 13V to energize the reject initiating relay 36CR. Under correct percentages of dwell, valve 12V will be held blocked, valve 11V will be held conductive blocking valve 13V preventing a reject operation and upon still further decrease beyond a predetermined limit valve 11V will again be blocked by the charge on the capacitor 13C permitting valve 13V to conduct and energize the relay 36CR for initiating a reject operation for incorrect dwell time of the engine distributor.

In Fig. 1F, valve 10VB is shown and the anode of which is connected by means of conductor 120 to the bus L58 and the cathode is connected through a resistor 36R and conductor 122 to the bus L60. The grid of the valve 10VB is connected to capacitor 19C and conductor 124 to the common point between the resistor 28R and the anode of the valve 10VA. It might be herein noted that valves 10VB and 10VA, if desired, be contained within a single envelope but have shown herein to be two separate valves in two separate envelopes for purposes of simplicity. It will thus be seen that the grid to cathode bias of the valve 10VB is that appearing across the inductance 10T. Such a potential will appear whenever the engine E is operating since under these conditions the valve 10VA will be periodically conducting. Under these conditions when the engine E is operating the valve 10VB will likewise be continuously blocked and will not establish a potential across the capacitor 20C which is applied between the control grid and cathode of the valve 14V permitting valve 14V to conduct and maintain relay 35CR energized and its contacts 35CRB closed for normal operation of the test apparatus.

The anode of the valve 14V is connected through the energizing winding of the control relay 35CR to one terminal of the secondary winding of transformer 12T2, the other terminal of which secondary winding is connected to the cathode of the valve 14V. When the valve 10VB is not conducting indicative of a running condition of the engine E the valve 14V will be held conductive since no blocking potential appears across the capacitor 20C. Upon stopping of the engine E, however, the valve 10VB will be rendered conductive establishing a potential across capacitor 20C which blocks the valve 14V to de-energize the relay 35CR whereby its contacts 35CRB (Fig. 1A) will open.

If any of the reject relays 12CR, 13CR or 14CR are energized due to a reject condition responsive to incorrect oil pressure, low coolant flow or high coolant temperature, their respective A contacts will close to energize the relays 10CR and 11CR will be energized shutting down the apparatus as descried above and de-energizing the relays 2CR and 6CR whereby only the first reject to occur will be indicated. The associated pilot or reject light will be energized and the holding or B contacts will close to maintain the operated relay energized even though the reject signal disappears.

If for some reason or other the speed of the engine and consequently the induction generator and tachometer magneto TM becomes excessive sufficient voltage is induced between the lines L12 and L14 to cause the relay 2WR (Fig. 1D) to be energized for closing its contacts 2WRA for energizing the relay 26CR. Energization of 26CR closes its contacts 26CRA and opens its contacts 26CRB. Opening of contacts 26CRB de-energizes line L10 thereby directly de-energizing the relays 1CR, 2CR, 3CR, 18CR, 19CR and 23CR and indirectly relay 8CR controlling the collection of oil in the engine crankcase, and the fuel control solenoid SV6 which terminates further fuel flow to the engine carburetor. The engine will therefore soon stop whereby relay 35CR will become de-energized opening its contacts 35CRB without effect since the circuit closed thereby will have already been opened by contacts 26CRB. Closure of contacts 26CRA is without immediate effect since the relay 23CR is normally energized during a testing operation and holds its contacts 23CRB open. The relay 2WR is provided with a holding device such as a permanent magnet 86 whereby when once actuated it will remain actuated until such time as winding 90 is energized to reset the relay 2WR. Under these conditions relay 26CR remains energized until relay 23CR energized the winding 90.

At the end of a test cycle or upon a shut down of the apparatus for abnormal operation, the relay 23CR is de-energized and its contacts 23CRB are closed so that if the relay 2WR has been energized due to an overspeed condition, the control winding 90 will be energized to pull the armature of the relay 2WR away from the permanent magnet 86 to areset the control relay 2WR. Such resetting of the control relay 2WR will again de-energize the control relay 26CR. Since the contacts 26CRA are only closed if an overspeed condition has occurred and a resetting operation of the relay 2WR is required, winding 90 will not be energized unless relay 2WR has been actuated even though the contacts 23CRB close at the end of each test operation.

As indicated in Fig. 1D, the horsepower output of the induction generator is visually indicated by means of the pointer 200 of a wattmeter 202 having potential leads connected to the lines L1, L2, and L3 having current leads supplied from current transformers 2CTA and 2CTB in the lines L3 and L1 respectively.

What is claimed and is desired to be secured by United States Letters Patent is as follows:

1. In a network for testing the percentage closed time of making and breaking contacts such as those of an internal combustion engine distributor, a plurality of electric valves each having a pair of main electrodes and a control electrode, circuit means adapted to connect one of said main electrodes and said control electrode of one of said valves across the contacts of said engine distributor, an anode circuit for said one valve main electrode including an impedance, an anode circuit for said main electrodes of a second of said valves including an impedance and including a connection for maintaining corresponding ones of said main electrodes of said one valve and said second valve at fixed potentials relative to each other, a connection for connecting said second valve control electrode to said one valve anode circuit whereby the potential of said second valve grid relative to said second valve corresponding main electrode is a function of the conducting condition of said one valve, and electrical energy storage device connected in parallel with said second valve anode circuit impedance, circuit means connecting corresponding one of said main electrodes of a third and a fourth of said valves together and to said storage device, potential dividing means associated with said storage device and having a pair of output terminals at different potentials, means connecting said third valve control electrode to one of said terminals, means connecting said fourth valve control electrode to the other of said terminals, an anode circuit for said third valve including an impedance, said third valve having a second control electrode, an anode circuit for said fourth valve including an impedance, means electrically connecting said third valve second control electrode with said fourth valve circuit impedance whereby the change in potential across said fourth valve circuit impedance will change the potential between said second control electrode and said corresponding main electrode of said third valve, a fifth of said valves, an anode circuit for said fifth valve and including a device actuated as a function of current flow through said fifth valve anode circuit, means connecting said control electrode and one of said main electrodes of said fifth valve across said third valve anode circuit impedance whereby current flow through said valve anode circuit impedance network controls the bias potential between said fifth valve control electrode and said fifth valve one electrode.

2. A testing apparatus for testing an internal combustion engine having a distributor with primary contacts, a carburetor including a throttle and an output shaft arranged to be coupled to drive an induction generator adapted to be selectively coupled to an alternating voltage network of substantially constant frequency comprising; a network for supplying ignition current to the distributor, a fuel valve controlling flow of fuel to the carburetor, a plurality of time controlled switches, a plurality of reject indicating circuits, means for connecting the output of the generator to the alternating potential network, relay means energized in response to an engine running condition for closing a normally open switch, a second relay means having a normally closed switch in parallel arrangement with said normally open switch, means operable to render said supply network effective to supply current and to prepare a circuit for operating said valve, means operable to render said last-named circuit effective to operate said valve for flow of fuel to the carburetor and to prepare a circuit for operating said time switches whereby they are effective to operate in a predetermined time sequence, means actuated by one of said time switches for actuating said throttle to increase the power output of the engine, means responsive to the speed of the generator and operable at a predetermined gnerator speed to actuate said generator connecting means for connecting said generator to said alternating potential network, one of said reject circuits including a second of said time switches and a control switch serially arranged, said control switch being normally closed and said second time switch being normally open, means responsive to the magnitude of current output of said generator and operable at a predetermined minimum value thereof to move said control switch to open position, the time of operation of said second time switch being so chosen with respect to said first time switch that with a normal engine said control switch will be moved to open position as a result of a generator output at least equal to said minimum value prior to the opening of said second time switch, an integrating circuit actuated by the opening and closing of the primary contacts of the distributor and having a control relay with current controlling contacts, said relay being rendered in a condition to close its said contacts as a consequence of a percentage closed to open time of said distributor contacts below a predetermined minimum and above a predetermined maximum, said relay contacts being maintained open between said minimum and maximum percentages, said relay contacts being operable upon closure to energize a second of said reject circuits, one of said reject circuits being operable upon being energized to render said time switches ineffective to continue operation in said sequence and for opening said second relay means normally closed switch, said engine running responsive means being operable in response to engine operation to maintain said supply network effective to supply ignition current to the distributor and effective upon stopping of the engine to render said supply network ineffective.

3. A testing apparatus for testing an internal combustion engine having a distributor with primary contacts, a carburetor including a throttle and an output shaft arranged to be coupled to drive an induction generator adapted to be selectively coupled to an alternating voltage network of substantially constant frequency comprising; a network for supplying ignition current to the distributor, a fuel valve controlling flow of fuel to the carburetor, a plurality of time controlled switches, a plurality of reject indicating circuits, means for connecting the output of the generator to the alternating potential network, relay means energized in response to an engine running condition for closing a normally open switch, a second relay means having a normally closed switch in parallel arrangement with said normally open switch, means operable to render said supply network effective to supply current and to prepare a circuit for operating said valve, means operable to render said last-named circuit effective to operate said valve for flow of fuel to the carburetor and to prepare a circuit for operating said time switches whereby they are effective to operate in a predetermined time sequence, means actuatd by one of said time switches for actuating said throttle to increase the power output of the engine, means responsive to the speed of the generator and operable at a first predetermined generator speed to actuate said generator connecting means for connecting said generator to said alternating potential network, one of said reject circuits including a second of said time switches and a control switch serially arranged, said control switch being normally closed and said second time switch being normally open, means responsive to the magnitude of current output of said generator and operable at a predetermined minimum value thereof to move said control switch to open position, the time of operation of said second time switch being so chosen with respect to said first time switch that with a normal engine said control switch will be moved to open position as a result of a generator output at least equal to said minimum value, means controlled by a third of said time switches and operable subsequent to said second time switch for establishing a second generator speed above said first speed at which said generator speed is responsive, means actuating said generator connecting means to disconnect said generator from said alternating potential, an integrating circuit actuated by the opening and closing of the primary contacts of the distributor and having a control relay with current controlling contacts, said relay being rendered in a condition to close its said contacts as a consequence of the percentage closed to open time of said distributor contacts below a predetermined minimum and above a predetermined maximum, said relay contacts being maintained open between said minimum and maximum percentages, said relay contacts being operable upon closure to energize a second of said reject circuits, one of said reject circuits being operable upon being energized to render said time switches ineffective to continue operation in said sequence and for opening said second relay means normally closed switch, said engine running responsive means being operable in response to engine operation to maintain said supply network effective to supply ignition current to the distributor and effective upon stopping of the engine to render said supply network ineffective.

4. In a testing apparatus for testing an internal combustion engine having a fuel flow controller, an electrical circuit including a lock-in relay having an energizing winding and an indicating lamp and a control switch for controlling the energization of said winding and said lamp, switch actuating means sensitive to an operating characteristic of such engine and responsive to a first magnitude of said characteristic to maintain said switch in open position and responsive to a second magnitude of said characteristic to move said switch to closed position, switch contacts actuated by said relay for maintaining said winding and said lamp energized upon initial energization of said winding by said control switch, an engine shut-down circuit including a shut-down relay winding and circuit controlling contacts of said lock-in relay which are closed to energize said shut-down relay as a consequence of the energization of said lock-in relay winding, an electrically operated fuel flow valve, a fuel flow valve controlling circuit including normally closed contacts of said shut-down relay whereby said valve is normally energized to permit fuel flow to such engine, a throttle controlling circuit including an energizable electrical actuating winding operable upon being energized to cause such engine controller to be moved to a reduced fuel flow position and including normally open contacts of said shut-down relay, said shut-down relay winding being operable upon energization to de-energize said flow valve to terminate flow of fuel to such engine and to energize said throttle controlling circuit to reduce the power output of such engine.

5. In a testing apparatus for testing an internal-combustion engine having a fuel flow controller, an electrical circuit including a lock-in relay having an energizing winding and a control switch for controlling the energization of said winding, switch actuating means sensitive to an operating characteristic of such engine and responsive to a first magnitude of said characteristic to maintain said switch in a first circuit controlling position and responsive to a second magnitude of said characteristic to move said switch to a second circuit controlling position, switch contacts actuated by said lock-in relay as a consequence of said switch being moved from its said first to its said second condition for maintaining said winding in its correspondingly energized condition, an engine shut-down circuit including the winding of a shut-down relay and circuit controlling contacts of said lock-in relay arranged to actuate said shut-down relay from a first operating condition to a second operating condition as a consequence of the response of said lock-in relay to a movement of said control switch to its said second controlling position, an electrically operated fuel flow valve, a fuel flow valve controlling circuit including a first contact of said shut-down relay whereby said valve is normally maintained in a position to permit fuel flow to such engine when said shut-down relay is in its said first operating condition, a throttle controlling circuit including an energizable electrical actuating winding operable to cause such engine controller to be moved to reduced fuel flow position and including a second contact of said shut-down relay, said shut-down relay winding being operable in its said second operating condition to actuate its said first contact to actuate said flow valve to terminate flow of fuel to such engine and to actuate its said second contact to actuate said throttle controlling circuit to reduce the power output of such engine.

6. A controlling network for an apparatus adapted to test the operating characteristic of an internal-combustion engine having an output shaft coupled for driving an induction generator and having a controller for regulating the power generated by the engine, throttle controlling means for controlling the flow of fuel to the engine, a sensing circuit including sensing means responsive to an engine operating characteristic, said sensing means being operable in response to the occurrence of an operating fault of the engine to actuate said sensing circuit, circuit controlling means rendered effective as a consequence of the actuation of said sensing circuit to move the said throttle controlling means to a first position to reduce the power output of the engine, a fuel flow controlling valve controlled by said circuit controlling means and actuatable thereby to move to a valve closed position to terminate flow of fuel to the engine as a consequence of said circuit controlling means being rendered effective, locking means rendered effective by said circuit controlling means for maintaining said valve in its closed position and said throttle controlling means in its said first position, and means responsive to the stopping of the engine for rendering said locking means ineffective.

7. A controlling network for an apparatus adapted to test an operating characteristic of an internal combustion engine having a controller for regulating the power delivered by the engine and having its output shaft coupled for driving an induction generator operably associated with, and adapted to deliver power to, a loading network, said controlling network including an electrical circuit having a normal operating condition and a reject responsive operating condition, means sensitive to an operating characteristic of said engine and operatively connected to control said circuit, said sensitive means being normally operable to maintain said circuit in said normal condition and operable in response to the occurrence of a fault in said characteristic to place said circuit in said reject condition, and controller actuating means controlled by said circuit and operable as a consequence of said circuit being rendered in said reject condition to actuate said controller to reduce said engine power.

8. In a testing apparatus for testing an internal-combustion engine having a throttle and a carburetor and a power output shaft and connected to drive a three-phase alternating voltage-type induction generator, a contactor for connecting and disconnecting said generator to a three-phase power network of established frequency, a throttle regulating mechanism for actuating such engine throttle to control the power output of such engine and including means for controlling the rate at which such throttle may be actuated to open condition, a first timer for controlling the sequence of operation of such engine and said testing apparatus and comprising a plurality of sequentially operated switches, a second timer for timing the period between the completion of the testing of a first such engine and the starting of the testing of the next such engine, a plurality of sensing circuits for testing a plurality of different characteristics of the engine being tested, an initiating network operable to initiate the operation of said first timer and including a first of said first timer switches, said first switch being operable upon manual initiation of said initiating network to maintain said first timer energized for a complete timing cycle and to thereafter de-energize said first timer, a load controlling network for controlling said throttle regulating mechanism and rendered effective to open such engine throttle under control of a second of said first timer switches, a tachometer circuit responsive to the speed of said generator and effective at a first generator speed to actuate said contactor to connect said generator to said network, said first generator speed being slightly below the synchronous speed of said generator with respect to the frequency of said power network, a power measuring network responsive to the power delivered by said generator to said network, a low power rejecting circuit including a low power relay and a low power alarm device, said low power rejecting circuit including a third of said first timer switches and a first power responsive switch actuatable by said power measuring circuit as a consequence of a desired magnitude of power being supplied by said generator to said power network, said low power rejecting circuit being ineffective to actuate said low power relay when said power responsive switch is actuated prior to said third timer switch and being effective to actuate said low power relay and said low power alarm device as a consequence of said third timer switch being actuated prior to said power responsive switch, said load controlling network including a second power responsive switch actuable by said power measuring network as a consequence of said desired power being supplied by said generator to said power network to render said throttle regulating mechanism ineffective to further open such throttle, an engine manifold pressure sensing network including pressure sensitive means operable to control the energization of said network in response to manifold pressure, an engine vibrating sensing network including a sensing means responsive to engine vibration, means rendered effective as a consequence of said generator delivering said desired power to said power network for rendering said manifold pressure sensing network effective to respond to its said sensing means and said vibration sensing network effective to respond to its said sensing means, means for terminating fuel flow to such carburetor, an engine shut-down network operable upon actuation to actuate said throttle regulating mechanism to reduce the output power of such engine and to actuate said fuel flow terminating means to terminate further flow of fuel to such carburetor, a timer interrupting circuit operable upon actuation to terminate further operation of said first timer to actuate said engine shut-down network, means actuatable as a consequence of the stopping of such engine for actuating said timer interrupting circuit to terminate operation of said first timer, said first timer switch being operable upon completion of a normal timing cycle for actuating said timer interrupting circuit to terminate operation of said first timer, circuit means including said first timer switch effective upon termination of engine operation to initiate operation of said second timer, and means effective as a consequence of said second timer completing a full timing cycle to energize an alarm to indicate that said testing apparatus is not being used, said first timer first switch being operable upon initiation of said first timer to render said second timer ineffective to continue its said timing operation, and means effective as a consequence of said second timer being rendered ineffective to reset said second timer to its initial position.

9. In a testing apparatus for testing an internal-combustion engine having a throttle and a carburetor and a power output shaft and connected to drive a three-phase alternating voltage-type induction generator, a contactor for connecting and disconnecting said generator to a three-phase power network of established frequency, a throttle regulating mechanism for actuating such engine throttle to control the power output of such engine and including means for controlling the rate at which such throttle may be actuated to open condition, a first timer for controlling the sequence of operation of such engine and said testing apparatus and comprising a plurality of sequentially operated switches, a plurality of sensing circuits for testing a plurality of different characteristics of the engine being tested, an initiating network operable to initiate the operation of said timer and including a first of said timer switches, said first switch being operable upon manual initiation of said initiating network to maintain said timer energized for a complete timing cycle and to thereafter de-energize said timer, a controlling network for controlling said throttle regulating mechanism and rendered effective to open such engine throttle under control of a second of said switches, a tachometer circuit responsive to the speed of said generator and effective at a first generator speed to actuate said contactor to connect said generator to said network, said first generator speed being slightly below the synchronous speed of said generator with respect to the frequency of said power network, a power measuring network responsive to the power delivered by said generator to said network, a low power rejecting circuit including a low power relay and a low power alarm device, said low power rejecting circuit including a third of said first timer switches and a first power-responsive switch actuatable by said power measuring circuit as a consequence of a desired magnitude of power being supplied by said generator to said power network, said low power rejecting circuit being ineffective to actuate said low power relay when said power responsive switch is actuated prior to said third timer switch and being effective to actuate said low power relay and said low power alarm device as a consequence of said third timer switch being actuated prior to said power responsive switch, said load controlling network including a second power responsive switch actuable by said power measuring network as a consequence of said desired power being supplied by said generator to said power network to render said throttle regulating mechanism ineffective to further open such throttle, a first engine characteristic sensing network including sensing means responsive to said first characteristic operable to control the energization of said network in response to the magnitude of said first characteristic, a second characteristic sensing network including a sensing means responsive to said second characteristic, means rendered effective as a consequence of said generator delivering said desired power to said power network for rendering said first sensing network effective to respond to its said sensing means and said second sensing network effective to respond to its said sensing means, means for terminating fuel flow to such carburetor, an engine shut-down network operable upon actuation to actuate said throttle regulating mechanism to reduce the output power of such engine and to actuate said fuel flow terminating means to terminate further flow of fuel to such carburetor, a timer interrupting circuit operable upon actuation to terminate further operation of said first timer to actuate said engine shut-down network, means actuatable as a consequence of the stopping of such engine for actuating said timer interrupting circuit to terminate operation of said timer, said first timer switch being operable upon completion of a normal timing cycle for actuating said timer interrupting circuit to terminate operation of said timer.

10. In a test apparatus for testing internal-combustion engines, throttle-controlling means for controlling the operation of such engine, a control device, a sensing unit for controlling said device, said sensing unit being responsive to an engine operating characteristic and effective at a first magnitude of said characteristic to hold said device in a first operating condition and effective at a second magnitude of said characteristic to place said device in a second operating condition, a sequencing device controlling the operating of said throttle-controlling means whereby such engine is operated in a desired manner, means for operating said sequencing device and normally controlled as a consequence of initial operation of said sequencing device to actuate said sequencing device throughout a complete sequencing operation, a timing device controlled by said sequencing device and rendered effective to initiate the timing out of a predetermined time period as a consequence of the completion of a sequencing operation of said sequencing device, alarm-actuating means actuated as a consequence of the expiration of said predetermined time period, and means for rendering said timing device ineffective and controlled by said sequencing device as a consequence of the operation thereof to perform a sequencing operation, said control device being effective when in said second condition to render said sequencing device operating means ineffective to actuate said sequencing device to complete its sequencing operation.

11. In an engine testing apparatus adapted to test a pair of operating characteristics of an internal-combustion engine, a plurality of electrically actuated relays, each said relay having an energizing winding and normally open sets of circuit controlling contacts, a pair of sensing units, each said unit comprising a switch and a sensing element responsive to an individual engine operating characteristic, each said element being operable in response to a first magnitude of the said characteristic to which it is responsive to hold its respective said switch in open circuit position and being operable in response to a second magnitude of the said characteristic to which it is responsive to hold its respective said switch in closed circuit position, a first characteristic sensitive circuit including in series circuit a first of said units and said winding of a first of said relays and one of said sets of contacts of a second of said relays, a second characteristic sensitive circuit including in series circuit a second of said units and said winding of a third of said relays and a second of said second relay contacts, a fourth relay having an energizing winding and a set of normally closed contacts, a third circuit including in series circuit said fourth relay contact set and said second relay winding and means for maintaining said third circuit energized whereby said second relay contact sets are held closed to render said sensitive circuits responsive to their respective said units, a fourth circuit including said first and second relay one contact sets connected in parallel with each other and in series with said fourth relay winding whereby the first sensing unit contacts to be closed de-energizes said second relay so that subsequent closure of the other of said sensing unit contacts is ineffective to actuate the said relay controlled by said other sensing unit contacts, a fifth circuit including a second set of said first relay contacts and said first relay winding for maintaining said first relay energized as a consequence of its initial energization by said first unit, and a sixth circuit including a second set of said third relay contacts and said third relay winding for maintaining said third relay energized as a consequence of its initial energization by said second unit.

12. In an engine testing apparatus adapted to test a pair of operating characteristics of an internal-combustion engine, means for controlling the rate of fuel supply to such engine, a plurality of electrically actuated relays, each said relay having an energizing winding and normally open sets of circuit controlling contacts, a pair of sensing units, each said unit comprising a switch and a sensing element responsive to an individual engine operating characteristic, each said element being operable in response to a first magnitude of the said characteristic to which it is responsive to hold its respective said switch in open circuit position and being operable in response to a second magnitude of the said characteristic to which it is responsive to hold its respective said switch in closed circuit position, a first characteristic sensitive circuit including in series circuit a first of said units and said winding of a first of said relays and one of said sets of contacts of a second of said relays, a second characteristic sensitive circuit including in series circuit a second of said units and said winding of a third of said relays and a second of said second relay contacts, a fourth relay having an energizing winding and a set of normally closed contacts, a third circuit including in series circuit said fourth relay contact set and said second relay winding and means for maintaining said third circuit energized whereby said second relay contact sets are held closed to render said sensitive circuits responsive to their respective said units, a fourth circuit including said first and second relay one contact sets connected in parallel with each other and in series with said fourth relay winding whereby the first sensing unit contacts to be closed de-energizes said second relay so that subsequent closure of the other of said sensing unit contacts is ineffective to actuate the said relay controlled by said other sensing unit contacts, a fifth circuit including a second set of said first relay contacts and said first relay winding for maintaining said first relay energized as a consequence of its initial energization by said first unit, a sixth circuit including a second set of said third relay contacts and said third relay winding for maintaining said third relay energized as a consequence of its initial energization by said second unit, a fifth of said relays having a winding arranged in series with said first and second relay one contact sets and having a set of contacts, a seventh circuit controlled by said fifth relay contact set and effective as a consequence of the actuation of said fifth relay to actuate said fuel supply controlling means to reduce the fuel flow to the engine.

13. The combination of claim 12 in which means is provided to terminate fuel flow to the engine and in which said fifth relay is provided with a second set of contacts effective upon energization of said fifth relay to actuate said fuel terminating means to terminate the flow of fuel to the engine.

14. In an engine testing apparatus adapted to test a pair of operating characteristics of an internal-combustion engine, a plurality of electric relays, each said relay having a winding and sets of circuit controlling contacts, a pair of sensing units, each said unit comprising a circuit controlling element and a sensing element responsive to an engine operating characteristic, each said sensing element being responsive to a different one of such pair of characteristics and actuatable from a first to a second operating condition as a function of the magnitude of the characteristic to which it is responsive, a first sensing circuit including a first of said relays and a first of said sensing units, whereby said first relay is actuated as a function of the operating condition of said first sensing element, a second sensing circuit including a second of said relays and a second of said sensing units whereby said second relay is actuated as a function of the operating condition of said second sensing element, a third circuit including a third of said relays, said third relay having a set of its said contacts associated with each of said first and said second sensing units, said third relay being actuated as a consequence of the actuation of one of said first and second relays to render the other of said first and second relays ineffective to be actuated by the respective said sensing unit associated therewith.

15. The combination of claim 14 in which there is provided means for regulating the output power of such engine and means actuated as a consequence of the actuation of said third circuit for actuating said output power regulating means to decrease the output power of such engine.

16. The combination of claim 14 in which a pair of indicating devices are provided, a first of said indicating devices being associated with and actuated by said first sensing circuit and a second of said indicating devices being associated with and actuated by said second sensing circuit, and means for maintaining each said sensing circuit relay in its actuated condition as a consequence of the actuation of its respective said sensing element to said second condition.

17. In a test apparatus for testing an internal-combustion engine having an output shaft arranged to drive an alternating current generating mechanism, a throttle controlling device for regulating the power generated by such engine, a switching device for connecting and disconnecting such generating mechanism to and from an alternating current network of substantially fixed frequency, a speed responsive device operatively connected to respond to the speed of such generating mechanism and operatively connected to actuate said switching device, a critical speed adjusting mechanism for controlling the critical speeds at which said speed responsive device actuates said switching device, an actuator for actuating said throttle device and effective to actuate said throttle device to increase the power generated by such engine and to decrease the power generated by such engine, and means actuatable concurrently with the actuation of said throttle device in a power increasing direction to adjust said critical speed adjusting mechanism whereby said generating mechanism is connected to said network at a first speed, said last-named means being actuatable concurrently with the actuation of said throttle device in a power decreasing direction to adjust said critical speed adjusting mechanism whereby said generating mechanism is disconnected from said network at a second speed, said second speed being greater than said first speed.

18. The combination of claim 17 in which said first speed is slightly below and said second speed is slightly above the speed at which said generating mechanism is in synchronism with the frequency of said network.

19. In an apparatus for testing prime movers in which the power output of the prime mover is absorbed by a main alternating current generating apparatus adapted to be selectively coupled to an alternating current network of fixed frequency, regulating means for increasing and decreasing the power output of the prime mover, a control voltage generating device coupled with said main generating apparatus and operable to deliver a potential which is a function of the speed at which said main generating apparatus may be driven, a controlling network operable upon energization to connect said main generating apparatus to said alternating current network, a potential sensitive switching apparatus having a potential sensitive actuating device and circuit controlling means connected in said controlling network for controlling the energization of said controlling network, means including a voltage regulating device connecting said potential sensitive actuating device to the output potential of said control voltage generating device, said potential sensitive actuating device being operable at a predetermined magnitude of the potential applied thereto to actuate said circuit controlling means to energize said controlling network, and actuatable means actuated by said regulating means and connected to said voltage regulating device for regulating the magnitude of the potential supplied by said control voltage generating device to said potential sensitive actuating device to regulate the speed at which said control voltage generating device actuates said potential sensitive switching apparatus to connect and disconnect said main generating apparatus to and from said alternating current network.

20. In a testing apparatus for testing an internal combustion engine under loaded conditions and in which such engine is provided with means for regulating the power produced thereby, control means adapted to control such regulating means, means for actuating said control means to increase the power output of such engine, an electrical network sensitive to the magnitude of such produced power and having output terminals, a first electric valve having a main electrode and a control electrode, circuit means connecting said terminals between said electrodes, a main electrode circuit for said valve and including a reactive network chargeable and dischargeable as a function of the conductive condition of said valve, a second electric valve having a control electrode and a main electrode, circuit means for applying the potential across said reactive network between said second valve electrodes, and means actuated as a function of the conductive condition of said second valve for controlling said actuating means.

21. The combination of claim 20 in which the polarity at which said first circuit means applies the potential between said terminals to said first named valve electrodes is such that the potential between said terminals is in a direction to render said first-named valve nonconductive, and said reactive network comprising a capacitor and a resistor connected in parallel.

22. In a controlling network for testing an internal combustion engine, a three phase induction generator, switching means adapted to connect and disconnect said generator to three conductors of a three phase network and including a winding and a control switch controlling the energization of said winding, a first control circuit connected between a first pair of such conductors whereby said first circuit is energized from a first phase of such network and including a throttle controlling device energizable by said first circuit to increase the power output of the engine, an actuator for controlling said control switch, and a second control circuit connected between a second pair of such conductors whereby said second circuit is energized from a second phase of said network which is a different phase from said first phase, said switching means winding being energized from said second circuit and said actuator being energized from said first circuit.

23. In a testing apparatus for an internal combustion engine having a fuel flow controlling means and a distributor having primary contacts, an electrical network for controlling said fuel flow means and including time controlled elements whereby the power output of and speed of said engine may be varied, a first electric valve having a pair of main electrodes and a control electrode, circuit means for connecting said contacts in shunt relation with said control electrode and one of said main electrodes whereby the average conduction of said valve is a function of the open and closed condition of said contacts, a control network connected between said main electrodes and including an energy storage device and an electrical apparatus actuated in response to changes in the energy stored in said storage device, said apparatus being energized when the magnitude of said stored energy goes either below or above a predetermined magnitude of stored energy, said apparatus being operable upon energization to actuate said network whereby said fuel flow means is actuated to reduce the fuel flow to said engine.

24. In a controlling circuit responsive to the output of an electrical potential supplying apparatus, a pair of conductors operatively connected for energization by said apparatus whereby the potential between said conductors is of fixed polarity and of a magnitude proportional to the output potential of said apparatus, a pair of valves, each said valve having a pair of main electrodes and a control electrode, a first and a second circuit means for respectively applying a first and a second potential bias respectively between said control electrode and one of said main electrodes of a first and a second of said valves, said potential bias being proportional to the potential between said conductors, each said bias being of such polarity as to act to oppose conduction of said valves, a source potential arranged in each said circuit means in effective opposite polarity to that of said first and second bias due to the potential between said conductors, the combined magnitude of said first bias and said source potential being of a first value and the combined magnitude of second bias and said source potential being of a second value whereby said valves are rendered conductive and non-conductive at different values of the potential between said conductors, and a control means individually associated with each of said respective pairs of said main electrodes and actuated as a consequence of the conductivity of the one of said valves with which it is associated.

25. In an engine testing apparatus for testing an engine having a normally open lubricant drain, timed controlled switches, a plurality of circuits individual to individual ones of said switches, certain of said circuit being operative to very certain of the operating characteristics of said engine whereby it may be tested for predetermined time intervals at various operating conditions, means for supplying the engine with lubricant and including a valve normally held in its open position, drain controlling means having first position in which said drain is open and a second position in which said drain is closed, another of said time switches being operable to cause said drain controlling means to move from said first to said second position, pressure sensitive means responsive to the depth of the lubricant in the engine and effective at a predetermined depth to close said valve to terminate further flow of lubricant to the engine, and means responsive to a stopped engine to cause said drain controlling means to move from said second to said first position and to maintain said valve in its closed position.

26. In a dwell responsive circuit for determining the percentage of time the contacts of a distributor, such as that of an internal combustion engine, are in one of its circuit controlling conditions, a plurality of electric valves, each said valve having a pair of main electrodes and at least one control electrode, a first main electrode circuit for a first of said valves and including a first impedance means which is energized as a function of the current flow between said main electrodes of said first valve, a first control circuit for said first valve connected between a said control electrode and one of said main electrodes of said first valve, said first control circuit having connections adapted to be operatively connected to such distributor whereby the potential applied by said first circuit to said first valve is a function of the operating condition of such distributor contacts, a second control circuit including said impedance means of said first main circuit and connected between a said control electrode and said main electrode of a second of said valves whereby the conductive condition of said second valve is a function of the conductive condition of said first valve, a second main electrode circuit for said second valve, said second main circuit including two parallel legs, a second impedance means in a first of said legs, a third impedance means in the second of said legs, one of said second and third impedance means being reactive in nature, a third and a fourth control circuit energized by the potential appearing across said third impedance means, said third control circuit being connected between a said control electrode and one of said main electrodes of a third of said valves, said fourth control circuit being connected between a said control electrode and one of said main electrodes of a fourth of said valves, a fourth impedance means in said second main circuit, means for supplying a potential to said third and said fourth control circuits as a function of the magnitude of the potential across said fourth impedance means, a third main electrode circuit for said third valve including a fifth impedance means, and a control circuit energized by said fifth impedance means and connected between a said control electrode and a said main electrode of said fourth valve.

27. In a dwell responsive circuit for determining the percentage of time the contacts of a distributor, such as that of an internal combustion engine, are in one of its circuit controlling conditions, a plurality of electric valves, each said valve having a pair of main electrodes and at least one control electrode, a first control circuit connected between a said control electrode and said main electrode of a first of said valves whereby the conductive condition of said first valve is a function of the operating condition of said control circuit, a first main electrode circuit for said first valve, said first main circuit including two parallel legs, a first impedance means in a first of said legs, a second impedance means in the second of said legs, one of said impedance means being reactive in nature, a second and a third control circuit energized by the potential appearing across one of said impedance means, said second control circuit being connected between a said control electrode and one of said main electrodes of a second of said valves, said third control circuit being connected between a said control electrode and one of said main electrodes of a third of said valves, a third impedance means in said first main circuit, means for supplying a potential to said second and said third control circuits as a function of the magnitude of the potential across said third impedance means, a second main electrode circuit for said second valve including a fourth impedance means, and a control circuit energized by said fourth impedance means and connected between a said control electrode and a said main electrode of said third valve.

28. In a dwell responsive circuit for determining the percentage of time the contacts of a distributor, such as that of an internal combustion engine, are in one of its circuit controlling conditions, a plurality of electric valves, each said valve having a pair of main electrodes and at least one control electrode, a first control circuit connected between a said control electrode and said main electrode of a first of said valves whereby the conductive condition of said first valve is a function of the operating condition of said first circuit, a first main electrode circuit for said first valve, said first main circuit including two parallel legs, a primarily resistive impedance means in a first of said legs, a primarily capacitive impedance means in the second of said legs, a second and a third control circuit energized by the potential appearing across said capacitive impedance means, said second control circuit being connected between a said control electrode and one of said main electrodes of a second of said valves, said third control circuit being connected between a said control electrode and one of said main electrodes of a third of said valves, a voltage divider in first said main circuit, means including said divider for supplying a potential to said second and said third control circuits whereby the potential supplied thereby to their respective said valves will vary as a function of the magnitude of the potential across said divider, a second main electrode circuit for said second valve including a fourth impedance means, and a control circuit energized by said fourth impedance means and connected between a said control electrode and a said main electrode of said third valve.

29. In combination, an alternating potential electric generator adapted to be driven by a variable speed prime mover, a switching device for connecting and disconnecting said generator to an energized alternating potential network, a rotatable potential producing device driven at a speed proportional to that of said generator and having an output potential, the magnitude of said potential being a function of the speed at which said device is driven, a relay having a winding and a circuit controlling device, circuit means connecting said winding to said output potential of said device and including means for adjusting the potential which must be supplied to said circuit means for actuation of said relay, a first control component controlling the power output of said prime mover, a second control component controlling said adjusting means of said circuit means, a timing device connected to control both of said control components, said timing device having a timing sequence such that said first control component is actuated to increase the output power of said prime mover during a time period in which said second component is actuated to reduce the potential required to actuate said relay and such that said first control component is actuated to reduce the output power of said prime mover during a time period in which said second component is actuated to increase the potential required to actuate said relay, and actuating means controlled by said circuit controlling device of said relay for connecting and disconnecting said generator to and from said energized potential network.

30. In combination, an alternating potential electric generator adapted to be driven by a variable speed prime mover, a switching device for connecting and disconnecting said generator to an energized alternating potential network, a rotatable potential producing device driven at a speed proportional to that of said generator and having an output potential, the magnitude of said potential being a function of the speed at which said device is driven, a relay having a winding and circuit controlling contacts, an impedance element connected in series circuit with said winding, circuit means connecting said series circuit across said output potential of said device, means including a switch connected in shunt circuit with said impedance element for adjusting the potential which must be supplied to said circuit means for actuation of said relay, a first control component controlling the power output of said prime mover, a second control component controlling said switch, a timing device connected to control both of said control components, said timing device having a timing sequence such that said first control component is actuated to increase the output power of said prime mover during a time period in which said second component is actuated to close said switch and such that said first control component is actuated to reduce the output power of said prime mover during a time period in which said second component is actuated to open said switch, an electrically actuated circuit controlling device for connecting and disconnecting said generator to and from said energized network, and means connecting said circuit controlling device to a source of potential and including said relay contacts whereby said relay controls said circuit controlling device.

References Cited in the file of this patent

UNITED STATES PATENTS

| Number | Name | Date |
|---|---|---|
| 1,803,147 | Seeley | Apr. 28, 1931 |
| 2,300,960 | Porter | Nov. 3, 1942 |
| 2,444,014 | Williams | June 22, 1948 |
| 2,450,835 | Lee | Oct. 5, 1948 |
| 2,513,816 | Patterson et al. | July 4, 1950 |